United States Patent
Clark et al.

(10) Patent No.: US 11,494,048 B2
(45) Date of Patent: Nov. 8, 2022

(54) VIEW VIRTUALIZATION

(71) Applicant: Home Box Office, Inc., New York, NY (US)

(72) Inventors: Brendan Joseph Clark, Seattle, WA (US); Brandon C. Furtwangler, Issaquah, WA (US); J. Jordan C. Parker, Seattle, WA (US)

(73) Assignee: HOME BOX OFFICE, INC., New York, NY (US)

(*) Notice: Subject to any disclaimer, the term of this patent is extended or adjusted under 35 U.S.C. 154(b) by 1074 days.

(21) Appl. No.: 14/841,577

(22) Filed: Aug. 31, 2015

(65) Prior Publication Data

US 2016/0070434 A1 Mar. 10, 2016

Related U.S. Application Data

(60) Provisional application No. 62/046,082, filed on Sep. 4, 2014.

(51) Int. Cl.
| | | |
|---|---|---|
| *G06F 3/04812* | (2022.01) | |
| *G06F 3/0485* | (2022.01) | |
| *G06F 9/451* | (2018.01) | |
| *G06F 8/38* | (2018.01) | |

(52) U.S. Cl.
CPC ........ *G06F 3/04812* (2013.01); *G06F 3/0485* (2013.01); *G06F 8/38* (2013.01); *G06F 9/451* (2018.02); *G06F 9/452* (2018.02)

(58) Field of Classification Search
CPC .... G06F 3/0481; G06F 3/0482; G06F 3/0483; G06F 9/4443; G06F 8/38; G06F 9/45512; G06F 8/34; G06F 3/04812; G06F 3/04845; G06F 9/451; G06F 9/452
See application file for complete search history.

(56) References Cited

U.S. PATENT DOCUMENTS

| | | | | |
|---|---|---|---|---|
| 5,680,619 A | * | 10/1997 | Gudmundson | G11B 27/034 717/108 |
| 5,802,380 A | * | 9/1998 | Bangs | G06F 40/166 715/235 |
| 5,929,927 A | * | 7/1999 | Rumreich | G09G 5/343 348/563 |
| 6,141,007 A | * | 10/2000 | Lebling | G06F 17/30716 707/E17.093 |

(Continued)

OTHER PUBLICATIONS

ZDNet, Setting Access Controls on Files, Folders, Shares, and Other System Objects in Windows 2000, Apr. 23, 2014, pp. 30.*

(Continued)

*Primary Examiner* — Seth A Silverman
(74) *Attorney, Agent, or Firm* — Amin, Turocy & Watson, LLP

(57) ABSTRACT

The described technology is directed towards having UI elements structured in a hierarchical configuration, in which parent and child UI elements communicate via a virtualization interface. A change to any parent UI element view propagates to each impacted descendant, e.g., each child, any children of that child and so on, whereby each child can manage virtualization and rendering based upon the change. Focus changes among the UI elements are also handled by propagating information via the virtualization interface.

20 Claims, 17 Drawing Sheets

(56) References Cited

U.S. PATENT DOCUMENTS

| | | | | |
|---|---|---|---|---|
| 6,188,406 B1* | 2/2001 | Fong | G06F 3/0482 | 715/810 |
| 6,249,284 B1* | 6/2001 | Bogdan | G06F 3/0481 | 715/764 |
| 6,252,597 B1* | 6/2001 | Lokuge | G06F 3/0481 | 715/841 |
| 7,203,701 B1* | 4/2007 | Packebush | G06F 17/30961 | |
| 7,543,278 B2* | 6/2009 | Klementiev | G06F 3/0481 | 707/999.004 |
| 7,590,614 B2* | 9/2009 | Fildebrandt | G06F 8/34 | |
| 7,631,278 B2* | 12/2009 | Miksovsky | G06F 9/451 | 715/856 |
| 7,984,388 B2* | 7/2011 | Dieberger | G06F 3/0482 | 707/797 |
| 8,099,682 B1* | 1/2012 | Konar | G06F 3/0482 | 715/853 |
| 8,205,168 B1* | 6/2012 | Van Slembrouck | G06F 3/0483 | 715/786 |
| 8,245,152 B2* | 8/2012 | Brunner | G09G 5/34 | 345/545 |
| 8,266,548 B2* | 9/2012 | Denkel | G06F 3/0482 | 715/713 |
| 8,281,258 B1* | 10/2012 | Dixon | G06F 3/04892 | 715/819 |
| 9,417,757 B1* | 8/2016 | Caiani | G06F 3/048 | |
| 2002/0180792 A1* | 12/2002 | Broussard | G06F 3/0481 | 715/764 |
| 2003/0025716 A1* | 2/2003 | Colavin | G09G 5/346 | 345/684 |
| 2003/0101235 A1* | 5/2003 | Zhang | H04L 51/04 | 709/218 |
| 2006/0010399 A1* | 1/2006 | Lau | G06F 3/0482 | 715/853 |
| 2006/0253795 A1* | 11/2006 | Titov | G06F 9/451 | 715/786 |
| 2009/0132956 A1* | 5/2009 | Mahasintunan | G06F 16/958 | 715/784 |
| 2010/0281064 A1* | 11/2010 | Ikegami | G06F 40/14 | 707/797 |
| 2012/0110499 A1 | 5/2012 | Hance et al. | | |
| 2013/0097539 A1* | 4/2013 | Månsson | G06F 3/0482 | 715/765 |
| 2013/0159922 A1* | 6/2013 | Borkowski | G06F 3/04855 | 715/786 |
| 2014/0108981 A1* | 4/2014 | Payzer | G06F 3/0481 | 715/767 |
| 2014/0122995 A1* | 5/2014 | Beckmann | G06F 17/3089 | 715/234 |
| 2015/0277741 A1* | 10/2015 | Morse | G06F 3/04855 | 715/786 |

OTHER PUBLICATIONS

Download Blog, How to show hidden files, folders, drives, and protected system files in Explorer under Windows 8 or 10, Jun. 24, 2014, pp. 8.*
User Mar. 10, Improve/combine makevisible( ) and scrollview( ), Feb. 11, 2014, GitHub, pp. 1-3.*
Roedy Green, Wayback Machine setVisible:Java Glossary, Sep. 10, 2014, Canadian Mind Products, pp. 1-3.*
International Search Report and Written opinion from International Patent Application Serial No. PCT/US15/47899, dated Nov. 3, 2015, 13 pages.
Joseph; "Virtualizing TreeView for Silverlight, with Diagrams," Jan. 13, 2011, 4 pages.
"Archive for the 'Item Containers' Category," Dr. WPF, Jul. 20, 2008, 18 pages.

* cited by examiner

VIEW VIRTUALIZATION

CROSS-REFERENCE TO RELATED APPLICATION

The present application claims priority to U.S. provisional patent application Ser. No. 62/046,082, filed Sep. 4, 2014, the entirety of which is incorporated herein by reference.

BACKGROUND

A set of data often contains far more individual data items than can be visualized on-screen at any given time. For example, a service may offer hundreds or even thousands of movie or television show titles by displaying an icon for each title, however only a small subset of them can be shown on a display's available screen real estate. Thus, a user often vertically or horizontally scrolls through the set of data represented by the data items to find a desired element to select.

Creating all of the user interface (UI) resources to represent such data is often far too resource-expensive to be practical, as there may be many thousands of items that can be presented. Thus, a typical way to handle this is to create only enough UI objects or the like (corresponding to some subset of the data items) that are actually displayed at any one time, which conserves resources. This is commonly referred to as UI virtualization, which is a standard performance optimization in a UI framework. In general, a user is given a viewing window into the subset of items and can scroll new items into and out of the viewing window, with the corresponding instances of the objects instantiated (created)/de-instantiated ("virtualized away") in memory as needed.

Further, objects that are virtualized away can often be re-used for different data instances, sometimes referred to as container recycling. This reduces the total number of objects that need to be created, which is often more efficient than creating new objects while deleting other objects.

When the elements are of uniform shape and size, such as same-sized rectangles, and the viewing region is a container array such as a list of items or a grid of items, it is relatively easy to determine which items to display at any given scrolling position in the viewing region. However, such constraints are very limiting.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, the technology described herein allows user interface (UI) elements to be structured in a hierarchical configuration. Parent and child UI elements communicate via a virtualization interface. A change to any parent UI element view, such as resulting from a user scroll operation, propagates to each impacted descendant, e.g., each child, any children of that child and so on, whereby each child can manage virtualization and rendering based upon the change. Focus changes among the UI elements also may be handled by propagating information via the virtualization interface.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
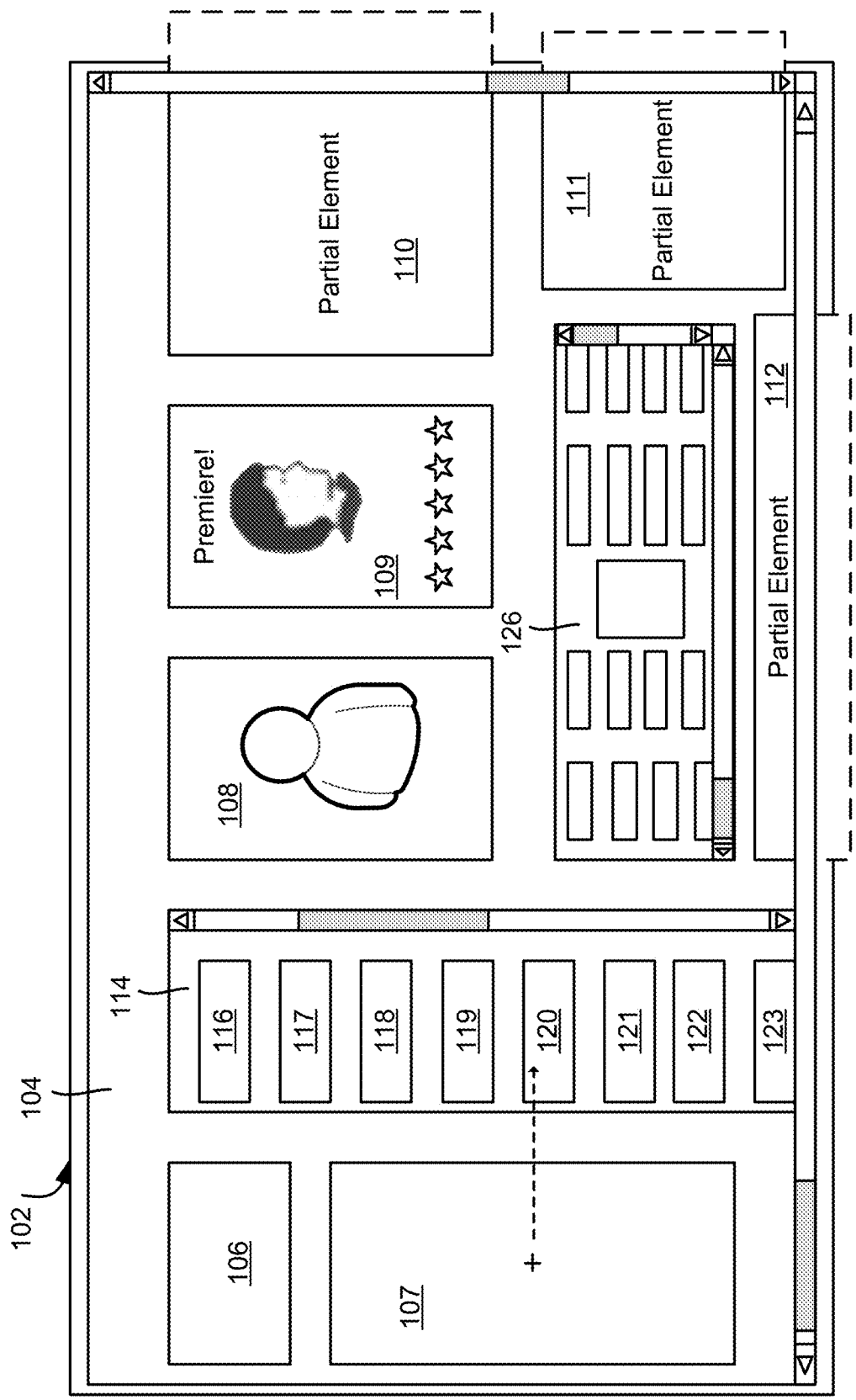
FIG. 1 is an example representation of a user interface based upon hierarchically structured user interface (UI) elements, according to one or more example implementations.

Various aspects of the technology described herein are generally directed towards a virtualization technology in which user interface (UI) objects are organized in a hierarchically structured way that allows for user interfaces to be as complex as desired by a developer. For example, a container UI element may be a UI control that contains a grid of user interface objects, in which some (or all) of the user interface objects also comprise controls that are containers of lists or grids. Each list or grid object in turn may possibly be a container control such as a list or grid, and so on.

Further, the rendered object sizes and/or spacing need not be uniform. This is true within a top-level parent container, as well as within a grid or list container within any UI control of the parent container, and so on. As one example, a television show that is highly popular may be represented by a larger-sized UI element than the UI element for a less popular one.

With respect to some of the terminology used herein, a "UI element" is a data object or other set of data (such as an image) that is capable of being represented in some way to a user, typically (but not necessarily) visibly represented as a view or sub-view, or as an element within a view or sub-view. For purposes of simplicity, the UI elements described herein are those that are able to be visibly represented based upon at least some of their corresponding data. A UI element is created as needed so as to be rendered when in view, that is, when visible on screen; (although at times placeholder may be used until a UI element can be fully created). A UI element may be cropped appropriately for viewing in part.

A "UI container" is a UI element that contains content comprising one or more other UI elements, any of which also may be UI containers. A UI container comprises an array of other UI objects such as a two-dimensional grid of UI elements or a list of UI elements arranged vertically or horizontally. As can be readily appreciated, a grid or list array may contain only a single UI element, and in some instances, may be empty. UI containers become scrollable when their content to be displayed exceeds the display region available for the content.

Each container is a parent to the child UI element(s) that it contains. A top-level container is a UI element that is hosted in a view host, and thus provides a "view" that is "in view" on the display. A container UI element that is a child of the top-level container can be considered as providing a "sub-view," and may be referred to as a sub-view even if only partially rendered in the view, and indeed, also when not currently rendered in the view. Note however that the term "view" is not limited to the top-level container, and instead depends on its current context; for example, when referring to a parent container (below the top-level container) that contains a child container, the parent container may be considered as providing a view and the child container as providing a sub-view within that view.

The view host is generally not considered a UI container, but does provide some rendering information to the top-level container, such as the positioning/dimensions of where the top-level container is to be rendered on the display, e.g., in pixels, as well as possibly other information such as a zoom level. Moving an application window, resizing an application window and/or zooming that result in changing the positioning/dimensions/zoom level of hosted application content are well-known concepts. These concepts are generally not discussed hereinafter except to note that the top-level parent container adapts to such changes and informs its child elements of the changes so that they may appropriately render themselves (or not) in the currently available space, which may be dependent on the current zoom level.

Each UI element other than the top-level container thus has a parent UI element and may have children UI element(s), forming a hierarchical view tree, at least part of which can be considered in view at any given time. Any child UI element that does not have its own child is represented by a leaf in the tree. As will be understood, a child UI element that is an object may be instructed by its parent UI element to render itself in accordance with region/bounds parameters. For a UI element that is not capable of rendering itself, such as a simple image referenced by a URL, the parent is responsible for virtualization, creating (or obtaining the data for) the UI element and directly rendering the UI element at an appropriate relative position in the container. As used herein, any such UI element is considered part of the parent container, and is not considered a child UI element. Note that such a UI element may be wrapped by a parent into an object that knows how to communicate with the parent and thereby render itself, in which event that wrapped UI element acts as a child element. As defined herein, a "child UI element" is one that may communicate with its parent. A child UI element may render itself according to parameters provided by its parent.

A child element that is a leaf node in the view tree may be interactive to thereby take some action when selected. A typical example is to click or tap on an interactive UI element that navigates to a new location such as a menu page, or an interactive UI element that when selected invokes a media player to play content associated with that selected UI element.

A UI element may be in a "virtualized" state in which the UI element is created and instantiated such that the UI element and its data fully exists in storage (e.g., memory), independent of whether that element is currently visible or not, in whole or in part. Note that a UI element may not be in view yet be in a virtualized state, such as with a "buffered" UI element created in anticipation of its being brought into view.

Conversely, an element may be in a "virtualized away" state, in which the item is not yet created or was previously in a virtualized state but no longer is, e.g., the element is physically discarded, de-instantiated for garbage collection, or recycled. A virtualized away element needs to be recreated if again needed in a virtualized state.

An element may be in a "partially virtualized" state in which the element is created and instantiated but does not have all of its data in a virtualized state. A straightforward example of an element in a partially virtualized state is a scrollable container element in which only the currently visible children are in a virtualized state, with those children that are not visible in virtualized away state. Such a container is partially virtualized. Note that (as with a virtualized UI element) a UI element in a partially virtualized state may or may not be currently visible, in whole or in part.

With respect to focus, a container object knows when a child element therein has focus, and which child has focus, and is in control of changing focus among its child elements as appropriate. A child element that has focus may be notified of this state so as to change its appearance, for example, although the container may perform some action to indicate focus without child involvement. Similarly with hovering, a container object may know when it is being hovered over, as well as which child (if any) is being hovered over. If a container knows this, the child may be notified to change its appearance when hovered over.

If the selectable interactive UI element is itself a container, selecting that container typically changes focus to a UI element within the selected container. A container may change its appearance when an element therein has focus, e.g., to indicate that it is an active container with a child element somewhere under its hierarchy that has focus. Indeed, a container that has a focused child element can be enlarged relative to other UI elements, or zoomed into, or otherwise altered to facilitate interaction with that container.

As will be understood, when focus is to leave a container to an uncertain destination outside of that container, the container informs its parent of this condition, and provides focus data to the parent related to the focus change, e.g., where focus previously was and what directional move request led to the focus change, e.g., an attempt to move focus right (or up, left, down, page up, tab and so on). Note that this need not be the situation when a user directly selects (e.g., clicks or taps) an element in another container, since that focus change destination is certain. When a parent is given focus change responsibility, the parent attempts to handle the focus change to change focus to a different child of that parent based upon the focus data, but if unable, notifies its parent to attempt to handle the focus change to one of its children. If no higher parent can handle the focus change request, the focus change request may bubble up all the way to the top-level parent; the top-level parent either handles the focus change request if it can or denies it.

Thus, a selectable UI element typically reacts in some way to selection (and possibly hovering) by user interaction with that element via a user interface, e.g., by clicking, touching, keyboard selection, voice selection, gesture selection, and so forth, including concepts such as eye gaze/blink sensing, brain wave sensing and so forth. Notwithstanding, a UI element may not be interactive; for example, a simple non-interactive image and/or set of text may be displayed within a container, such as a logo or advertisement.

As will be understood, in one or more implementations the UI objects that take part in virtualization as described herein each include an interface that allows communication between UI objects, whether the UI object is a parent UI object to one or more child UI objects hierarchically below it, or a child UI object to a parent UI object, or both. The top-level parent UI element is one that is hosted in a view host; for example, a top-level parent UI element may be hosted in an entire display screen or a sub-region thereof, in a program window, in a menu, or the like. The top-level parent UI object also includes a suitable interface set for communication with its child UI objects, as well as interfaces for communicating with the view host and possibly other objects or the like, e.g., objects of an application program.

In many instances, a user interacts with a set or subset of UI elements that are contained in a container UI view. This interaction may select an element, change focus, or may be a move request (a scroll action or other action that results in scrolling, such as paging). A user also may perform operations such as searches of a container's hierarchy and the like that determine a narrowed visible subset of displayed UI elements for displaying in that container. In general, a user may navigate among UI elements to select an element, for example an element representing a movie or television show that the user wants to view, or possibly some information about that movie, e.g., the cast and crew information.

It should be understood that any of the examples herein are non-limiting. For instance, example visible user interface (UI) elements in the shape of rectangles are described, however it is understood that these are only examples, and that other shapes may be used for the elements beyond those exemplified herein. As another example, media content such as movies, television shows, games and so forth may be presented in the form of data elements, however the data elements are not limited to media content, but may, for example, represent other types of objects such as data files, programs, images, text, database tables and so forth. Further, any of the logic and the like may be implemented in software, hardware or a combination thereof. Still further, an entertainment/game console is one example computing environment, however any other suitable computer-based device such as a personal computer, tablet device, mobile computer device and the like may implement the technology described herein. As such, the technology described herein is not limited to any particular embodiments, aspects, concepts, structures, functionalities or examples described herein. Rather, any of the embodiments, aspects, concepts, structures, functionalities or examples described herein are non-limiting, and the technology may be used in various ways that provide benefits and advantages in computing and user interfaces in general.

FIG. 1 shows an example UI interface in which a view host 102 hosts a top-level container 104 for display to a user for interaction therewith; (the view host 102 is generally represented as a border in FIG. 1 to emphasize its presence, but in many implementations a view host does not have any visible portion). In this example, the top-level container 104 is a grid container, in that its child elements may be arranged in a two dimensions in the view of the top-level container. Note that the top-level container 104 is not a "uniform" grid container having equally spaced, aligned and/or sized child elements, as the direct child elements of FIG. 1 are neither all equally spaced, aligned nor of the same size. Notwithstanding, the technology described herein provides benefits with uniform grids of equally spaced, aligned and/or equally sized child elements, (as well as uniform lists of equally spaced, aligned and/or equally sized child elements), as may be present in a given scenario.

In FIG. 1, rendered items include child elements 106-109, each of which corresponds to a sub-view that may be interactive (although it is possible one or more may be only a non-interactive rendering of some non-interactive content such as text data, image data, an animation, and so forth). Child elements 110-112 are elements that are only partially rendered at this time, (e.g., as indicated by the dashed portion outside of the view of the container 104). As is understood, such child elements 110-112 need some appropriate amount of scrolling of the top-level container 104 to come fully into view. Note that any of these elements 106-112 may be an interactive container, although not explicitly represented as such in FIG. 1.

A vertical list container 114 is rendered as a sub-view in the current view of FIG. 1. The vertical list container 114 is a parent to a list array of child elements; child elements 116-123 are visible at this time, although child element 123 is only partially visible. Any of the child elements 116-123 may be a parent container having one or more child elements, or may be UI elements that have no children.

The container 104 also contains a grid container 126 comprising a number of child elements arranged in two dimensions; (these child elements of the grid container 126 are not individually labeled in FIG. 1 to maintain clarity). As can be seen from the containers 104, 114 and 126, scrolling is active when the available space in any direction exceeds the amount of content that can be displayed.

One of the complexities of virtualization in a scenario such as in FIG. 1 is that virtualization may occur at any container, whether a top-level parent, a child, a child of a child and so on. For example, the vertical container 114 may have dozens or even hundreds (or more) of children, with only those currently in view instantiated into in a virtualized state.

Figure 2:
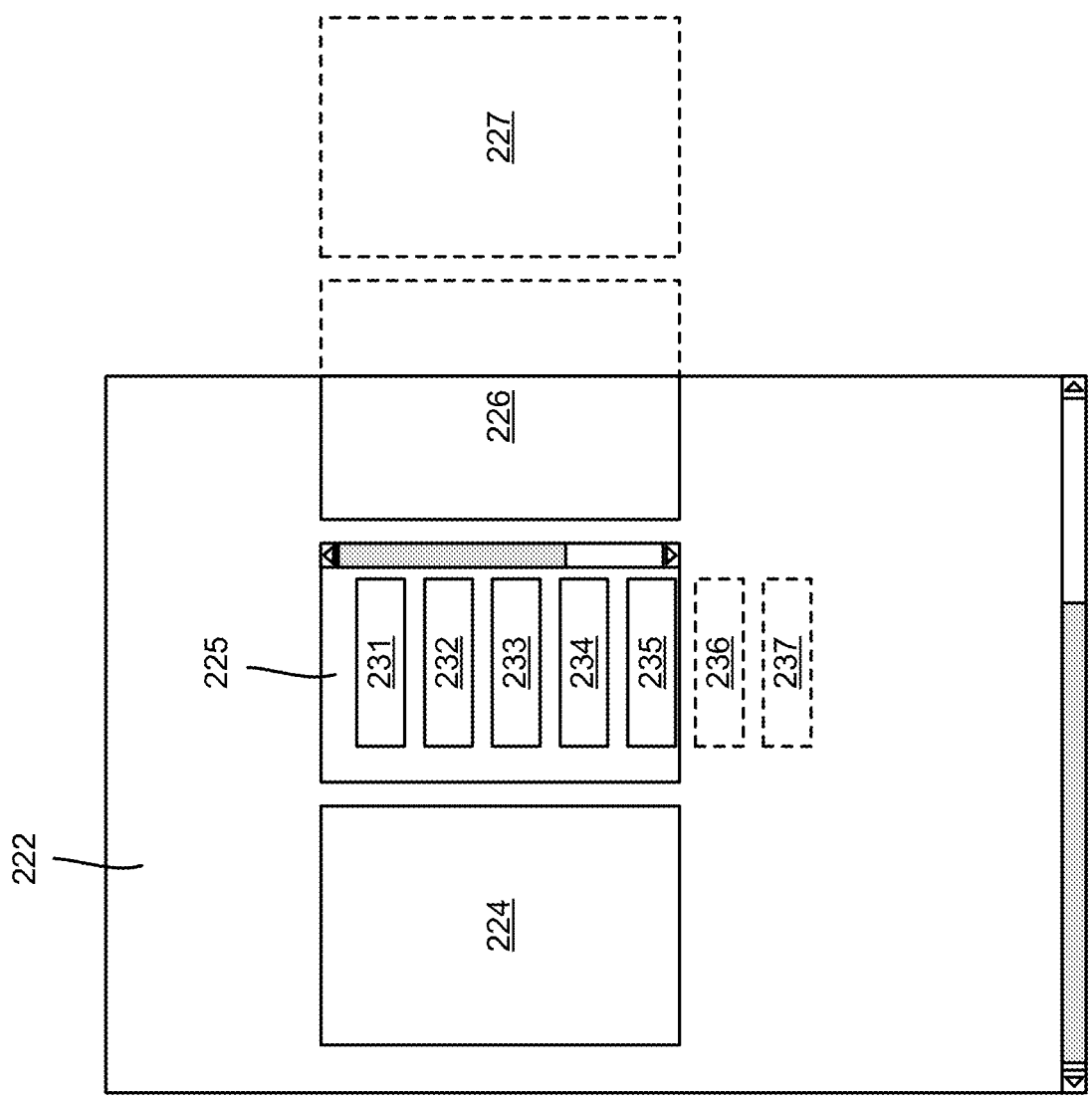
FIGS. 2 and 3 are example representations of how virtualization may be used, including with partially rendered elements and buffered elements created in advance, according to one or more example implementations.

By way of a less complex example, FIG. 2 shows a container 222 comprising a horizontal list of UI elements 224-227. The UI element 225 is a vertical list container containing items 231-237. (The dashes indicate that UI elements 227, 236 and 237 are not currently in view, or for the UI element 226, the part of the UI element 226 that is not currently in view. Note that the horizontal list container 222 shown in FIG. 2 may be the top-level container, or may be a child of a higher parent container.

As can be seen in FIG. 2, not only does the horizontal list container 222 deal with virtualization, in that the item 227 may or may not yet be created, but its child vertical list container 225 also deals with virtualization for its items 236 and 237. Further, as can be readily appreciated, any of the items 231-227 of the vertical list container 225 may be a container having child UI elements, and if so, those containers need to deal with virtualization when any of their UI elements are not in the current view.

Thus, virtualization needs to be managed by any container UI element, even one that is created but not currently in view, (because whether to create or keep its existing children virtualized is an issue). To this end, any change to a higher-level container view needs to propagate to all child containers and to their child containers and so on so as to deal with virtualization of UI elements, as well as re-rendering by the children. For example, if the top-level container is hosted in an application window that the user re-sizes, the top-level container is also re-sized, meaning either more space is available or less space is available for rendering its children. Moving a window also means that the visible content therein needs to be re-rendered based upon the new window location. Similarly, if the user zooms in or out, changes need to occur because some formerly in-view elements may be moved out-of-view when zooming in, or new elements moved into view when zooming out. The children in the hierarchy need to adapt accordingly.

Note that in addition to whether elements are within the view because of zooming, zoom may have an impact on virtualization decisions for elements still within the view. For example, if the top-level container is very-zoomed out, some of its children or children of its children may be too small to interact with, even when the top-level container is rendered on a very large display. Indeed, a rendered element may only be a few square pixels in area, or even only may be maintained as data at a sub-pixel level that is not visible. In such conditions, a very small or invisible UI element, even though in the view space, may be virtualized away.

Figure 3:
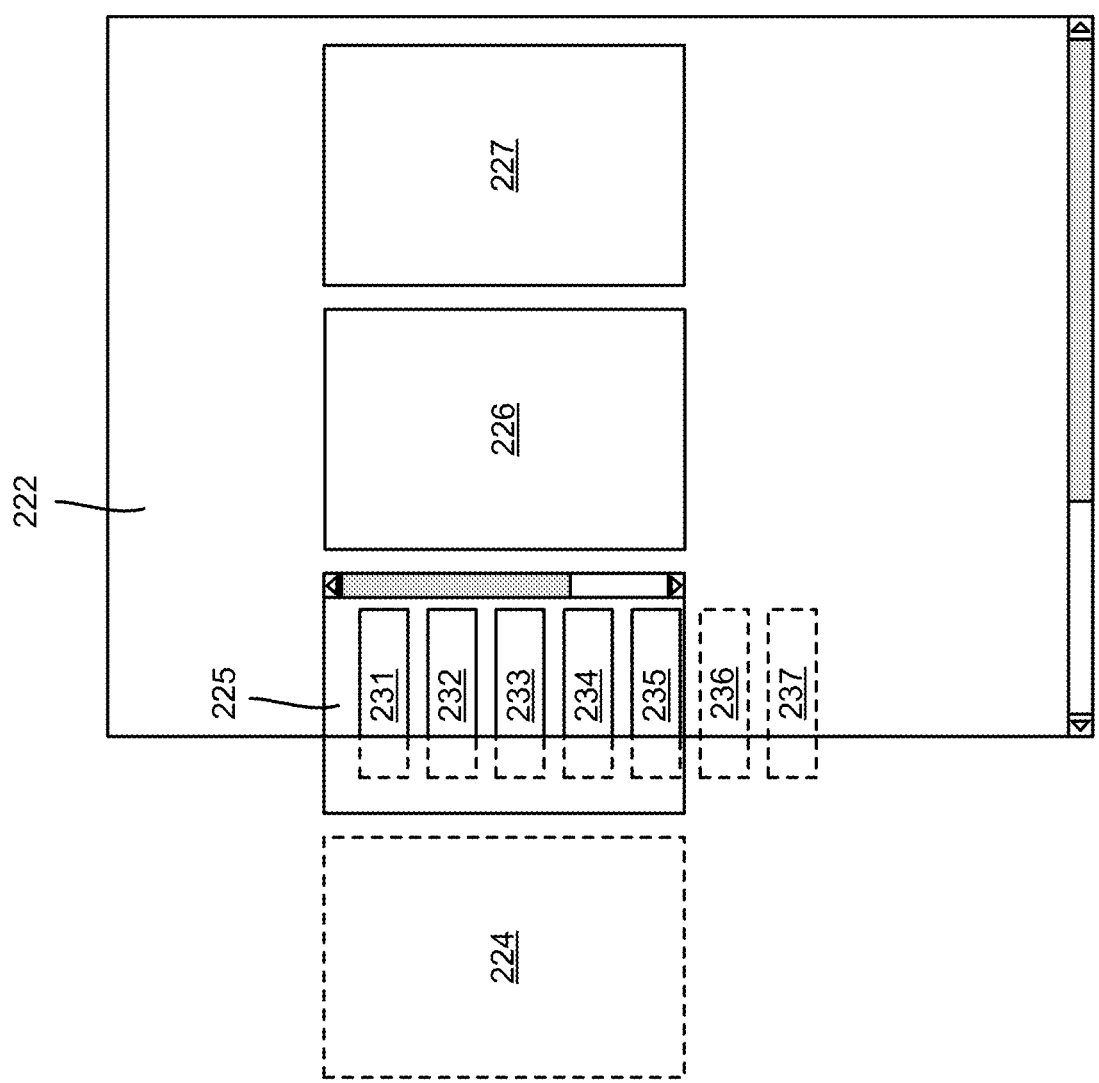

Typically more often than resizing or zooming, a user frequently interacts with a view or sub-view by scrolling. Changes to a view that need to be propagated include "move" changes as a result of scrolling, which impacts rendering and virtualization. For example, in FIG. 2, if the user scrolls far enough right, the item 227 may be created and the item 224 virtualized away. This is generally represented in FIG. 3; (it is understood that the container 222 does not actually move from the perspective of the user, but rather the child elements that are in it are re-rendered so as to move relative to the scrolled container).

Returning to FIG. 1, another of the complexities of such a user interface involves focus changing to an uncertain destination (a destination that needs to be computed rather than a destination in which the user changes focus by direct selection). By way of example, consider that the element 107 in FIG. 1 currently has focus, and the user, navigating by keyboard, selects (types or taps) the right cursor key, or via speech says something like "move right." This can be reasonably interpreted as the user likely wanting to shift focus to some child of the container 114. However, deciding which child element in the container 114 gets focus is not certain, because such a decision involves a more precise guessing of user intent. For example, the user may be intending to change focus to the very first element in the container 114, even if not displayed, or to the first child element 116 that is currently visible in the container, or to the closest child element to the right of where the user was when the user selected the right cursor key, which may be any of child elements 117 to 122 if only horizontal closeness is considered.

One reasonable solution is to use the midpoint of the item 107 (represented by the crossed lines at the center thereof) to determine closeness to the next container element, which in this example is the child element 120, as indicated by the dashed arrow from the midpoint to the child element 120. Notwithstanding, other closeness solutions are feasible, as well as solutions that are not based on distance, at least not entirely. Paging (e.g., by Page Up/Page Down, or possibly Tab/Shift-Tab keys) that indicates a user intent to skip over multiple elements per keystroke or the like is similarly an issue with respect to changing focus to an uncertain destination.

Another aspect of focus changing is when the user interacts in a way that moves a currently focused item completely out of view, e.g., by zooming, resizing the application or by scrolling some relatively large amount, including by paging. A new element in the new view may be given focus. If so, with elements spaced and sized in a non-uniform way, changing focus again needs to be based upon some reasonable interpretation of user intent. One reasonable solution is to change focus to use the last focused element's position to determine a new element that is closest to that position after moving, and if the element is a container, to select the first element in the container for possible focus. As will be understood, a container may use a set of logic/rules to handle focus changes, and the logic/rules may be customized per container.

Yet another complexity of virtualization involves buffering, comprising preemptively creating some container items that are currently out-of-view, typically so that when the user scrolls there is no perceived delay in creating those items. For example, in FIG. 2, the container 222 may choose to create the UI element for the item 227, even though not yet visible, anticipating the likelihood of the user scrolling right to get that item into view. If the element 227 being virtualized into existence is also a container that has children, that container 227 also needs to make a decision on whether to create its children, and if so, which ones.

Thus, a container need not only deal with virtualization of its children with respect to currently visible or not visible children, but with creating child elements in advance for buffering purposes. The problem is similar when dealing with whether a child that is no longer in view is to be kept buffered for possible future reuse or is to be virtualized away, which also impacts any children that child may have.

Buffered child containers that exist but are not in view also need to be notified of any changes that impact virtualization, such as caused by movement via scrolling, so that if moved into view they may render themselves and create any not-yet-created children, including children in view and any new buffered children desired in advance.

Figure 4:
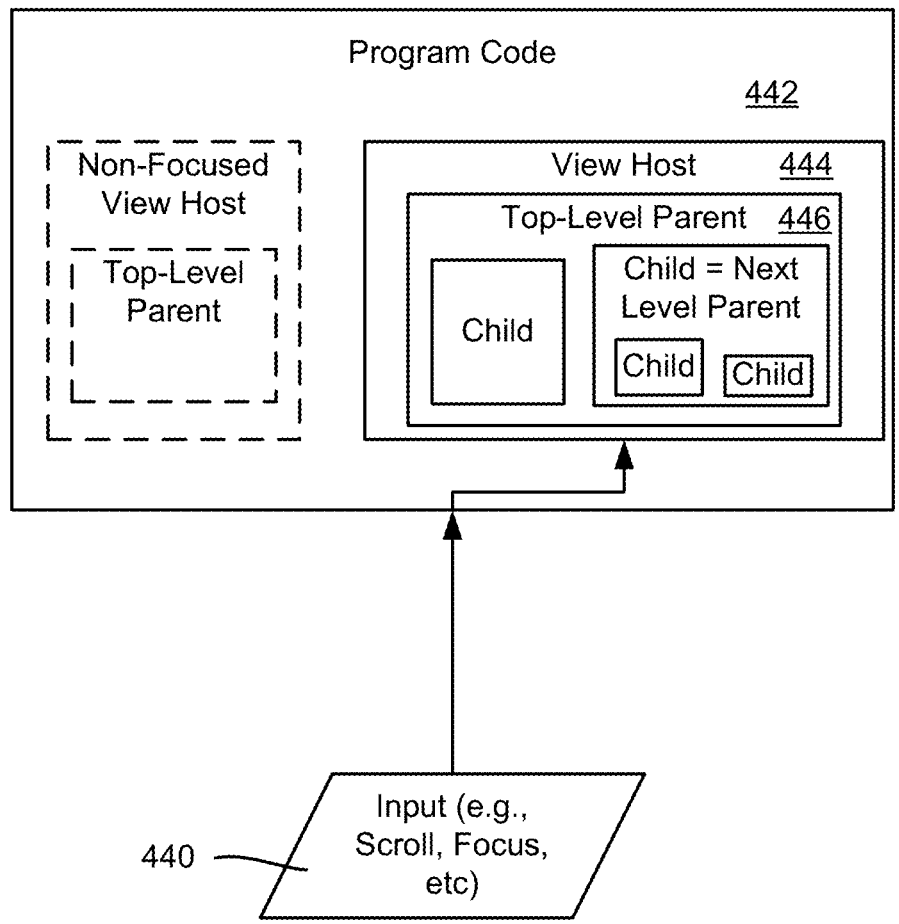
FIG. 4 is a block diagram showing various example components for implementing a hierarchically-based view virtualized user interface according to one or more example implementations.

As described herein, in one (e.g., streaming video program) implementation, an underlying platform includes view virtualization technology that is generally based on communication of information between parent and child objects, as generally represented in FIG. 4. In FIG. 4, data corresponding to user input 440 directed towards a location in an interactive region is provided to program code 442 (e.g., the program that has focus if multiple programs are loaded), which gets to the appropriate view host 444 (e.g., the view host that has focus if multiple view hosts are loaded in the application). The top-level parent 446 hosted by that view host takes action based upon the input. For purposes of the following examples, for now consider that the user input is not a hover action but some mouse click, keyboard action, touch, speech or other input that is specifically directed to a currently visible (at least in part) UI element.

With respect to virtualization, one typical action is some type of scroll action directed at the top-level parent container, e.g., via a top-level parent container scroll bar. When moved, the top-level parent container computes its relative scroll position within the bounds of its current region. In general, the top-level container 446 knows its width and height and its current X and Y position relative to some origin, and the current X and Y offset values within its scrollable space based upon any scrolling-type operations that occurred.

Any time there is a change that impacts the top-level container scroll position, relevant data needs to be propagated to its child elements so that each child can render itself (or not render itself) accordingly, and also manage virtualization. As can be readily appreciated, size changes and zoom level changes are likewise propagated.

Similarly, any time there is a scroll position change to a lower-level container, relevant data needs to be propagated to its child elements for rendering and virtualization purposes. Each child of an impacted parent has its own relative position (boundaries) within the total scrollable space of that parent.

When a child is also a parent to one or more children, each lower-level child has its own position (boundaries) within the total possible space of its parent, and its parent has its own scroll offset position. Thus, any change that impacts a parent needs to be propagated to that parent's descendants, including direct children, those children's children and so on to the lowest level element that is impacted.

Figure 5:
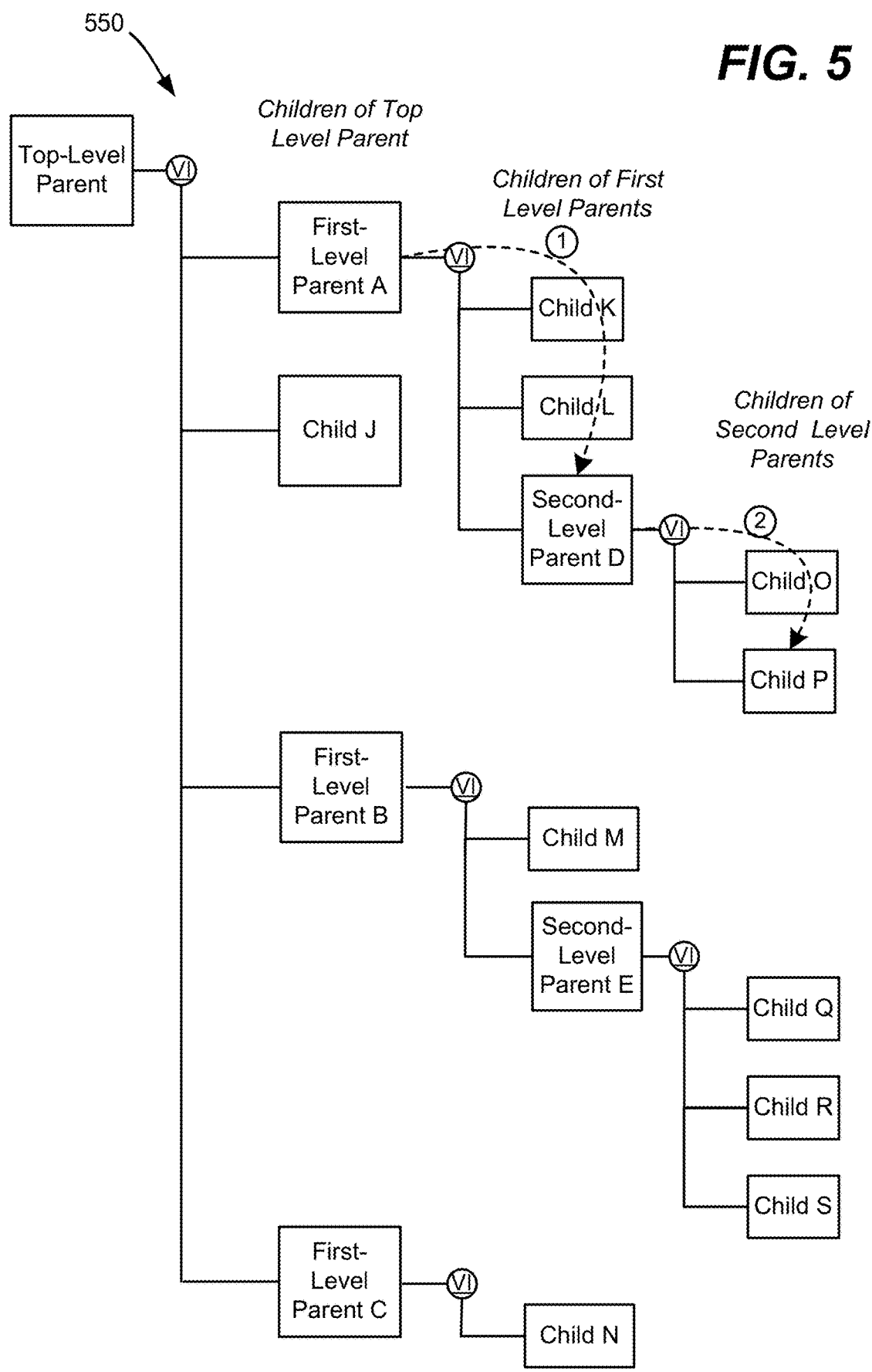
FIG. 5 is an example representation of a hierarchy of UI elements, including communication of a change from a parent element to its children, according to one or more example implementations.

FIG. 5 shows a UI element hierarchy 550. As can be seen in this example, there are direct children of the top-level parent container that are parents (containers) identified as Parents A, B and C, and also a child of the top-level parent container, Child J. Parent A has three children, Child K, Child L and child that is a second-level parent, Parent D. Parent D has two children, Child 0 and Child P. For brevity, the other sub-hierarchies below the first level parents, Parent B and Parent C, are not enumerated herein, as these are readily apparent from FIG. 5.

In the example of FIG. 5, consider that some scroll change or the like occurred with respect to parent A, whether as a result of scroll bar interaction, keyboard input, focus change and so on. This interaction changes the scroll position of parent A, meaning that the container's elements each need to be re-rendered (or removed from view) based upon the new scroll position.

To this end, as represented by a dashed, curved arrow labeled one (1) in FIG. 5, Parent A communicates position change information to its children, shown in FIG. 5 as Child K, Child L and Parent D. In turn, Parent D communicates the position change information to its children, Child 0 and Child P (arrow two (2)). As a result, each UI element that is impacted by the scrolling operation is notified and has the needed information to re-render or remove itself from view, as well as to virtualize or virtualize away any children accordingly. Further, as will be understood, the information that is communicated allows a parent to decide whether any children that are not in the new view are to be buffered, that is, created in advance (or kept instantiated) on the likelihood that they will be needed in a subsequent view.

In one example implementation, any UI element can opt in to virtualization as described herein by implementing a virtualization interface (VI), as generally shown in FIG. 5. With respect to the virtualization interface, to virtualize its children, a UI element is able to create those children on-demand, and to determine which children are in view at any given time.

As described herein, the parent calls into each of those items within the new view or buffered (inflated) view, allowing them to determine whether or not they also have sub-views that are to be displayed or virtualized away. The interface encapsulates the following concepts, e.g., implemented as methods:
  setting a desired region from the parent
  getting a desired region for the element itself
  getting the complete bounds of the element itself (not limited to what is visible)
  getting and setting a focused region
  moving a particular region into view Together, this interface allows UI elements of any particular configuration and at any hierarchical level to participate in virtualization as described herein. As one example, consider that a designer wants to take an existing list container UI element and wrap that list with a border or some descriptive text. The designer designs a parent container for that list container that has the desired border or descriptive text, and places it at a desired place in the hierarchy. Nothing changes from the perspective of the list container or its children; (other than perhaps its available rendering space is slightly reduced to accommodate the parent's border or text, however its available rendering space is variable even before the new parent wrapped it). Given the rendering region and its own scroll position in that region, the list is able to virtualize its child elements as before. New types of elements for future designs can easily plug-in to this virtualization technology and achieve the benefits of virtualization in a straightforward way.

The virtualization interface allows for views to virtualize in two dimensions as described herein. By way of example, if there is a vertical list with a horizontal list inside each item, the user can interact with both lists as expected, however each list only creates the elements needed for the visible region in view, plus possibly some buffered elements for an inflated view.

The virtualization interface allows for any participant to change its virtualized area and/or scroll position and have that change be adhered to by its descendant child elements. Further, if a particular view is scrollable, it may be desirable to buffer its virtualized region (or part thereof) by preemptively creating (or keeping instantiated) some elements, e.g., those that are just out-of-view, so that when the user scrolls there is no perceived delay in creating those items. This is accomplished by passing an inflated region through the interface, whereby each descendant element transparently reacts to this change, and if desired allocates any additional objects in that out-of-view (off-screen) space as well.

Focus management also may be tracked through the virtualization interface. If a user moves focus off-screen, the notification flows through this interface and allows child elements in the tree to report the expected region they desire if their view gains focus. When focus moves, one or more of the views in the tree may scroll in response to bring the focused view on-screen, which again may be achieved by propagating data through this interface.

Figure 6:
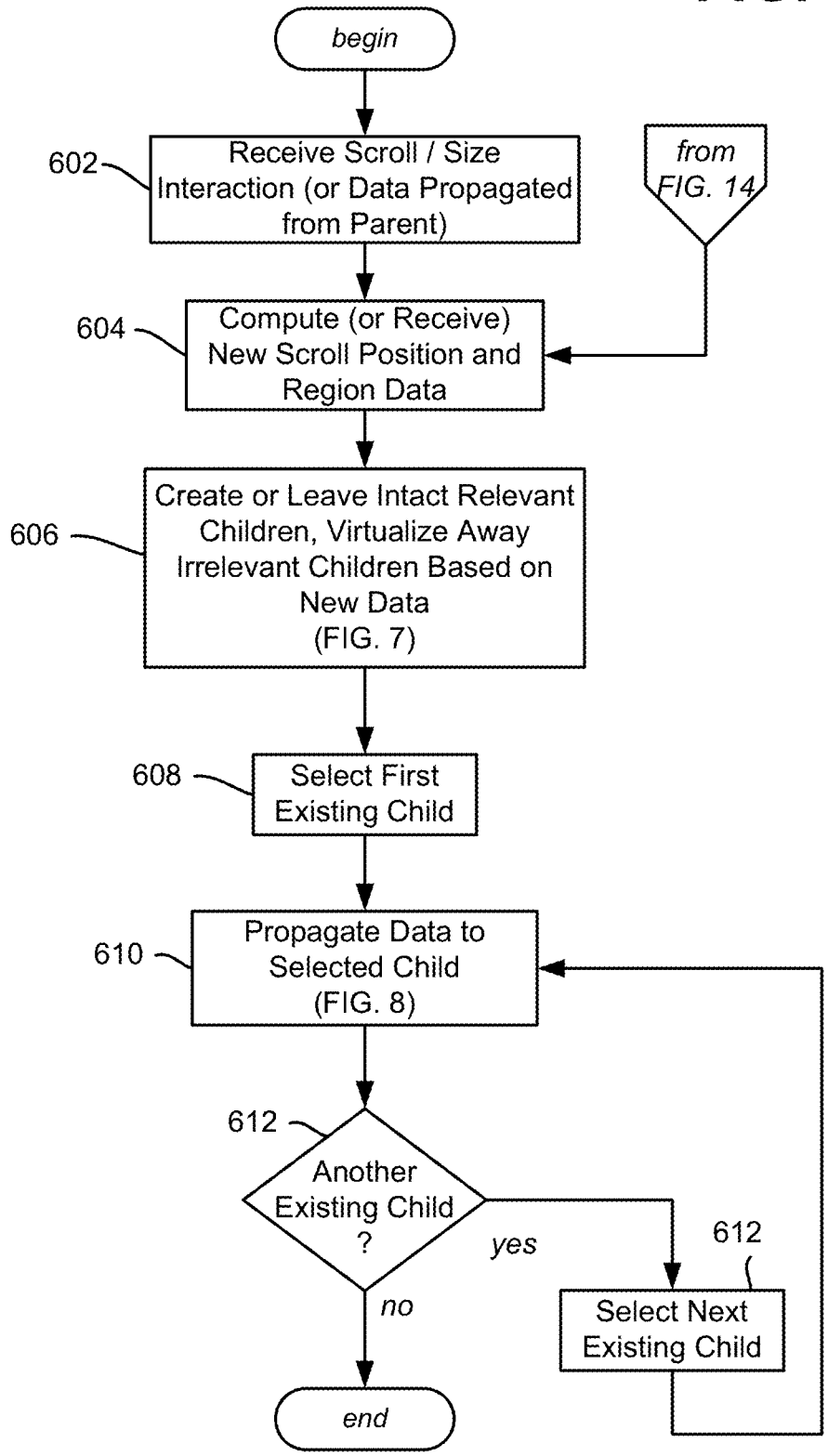
FIG. 6 is a flow diagram showing example steps related to propagating change information from a parent UI element to child UI elements, according to one or more example implementations.

FIG. 6 is a flow diagram showing example steps that may be taken by a parent container upon receiving a scroll interaction at step 602, which results in a new scroll position being computed at step 604. FIG. 6 also handles resizing, as the steps propagate the region data via the interface as well. Note that FIG. 6 also may apply when a focus change (FIG. 14 and FIG. 15) causes a scroll change resulting in a new scroll position at step 604.

Step 606 creates (and leaves intact) those children that are "relevant" to the new view based upon the new scroll position, namely any child that is to be in view (at least in part) after scrolling and any buffered child that although out-of-view is desired by the parent to have in a virtualized or partially virtualized state. Other "irrelevant" children are virtualized away. An example of how step 606 may be implemented is represented in FIG. 7.

Figure 7:
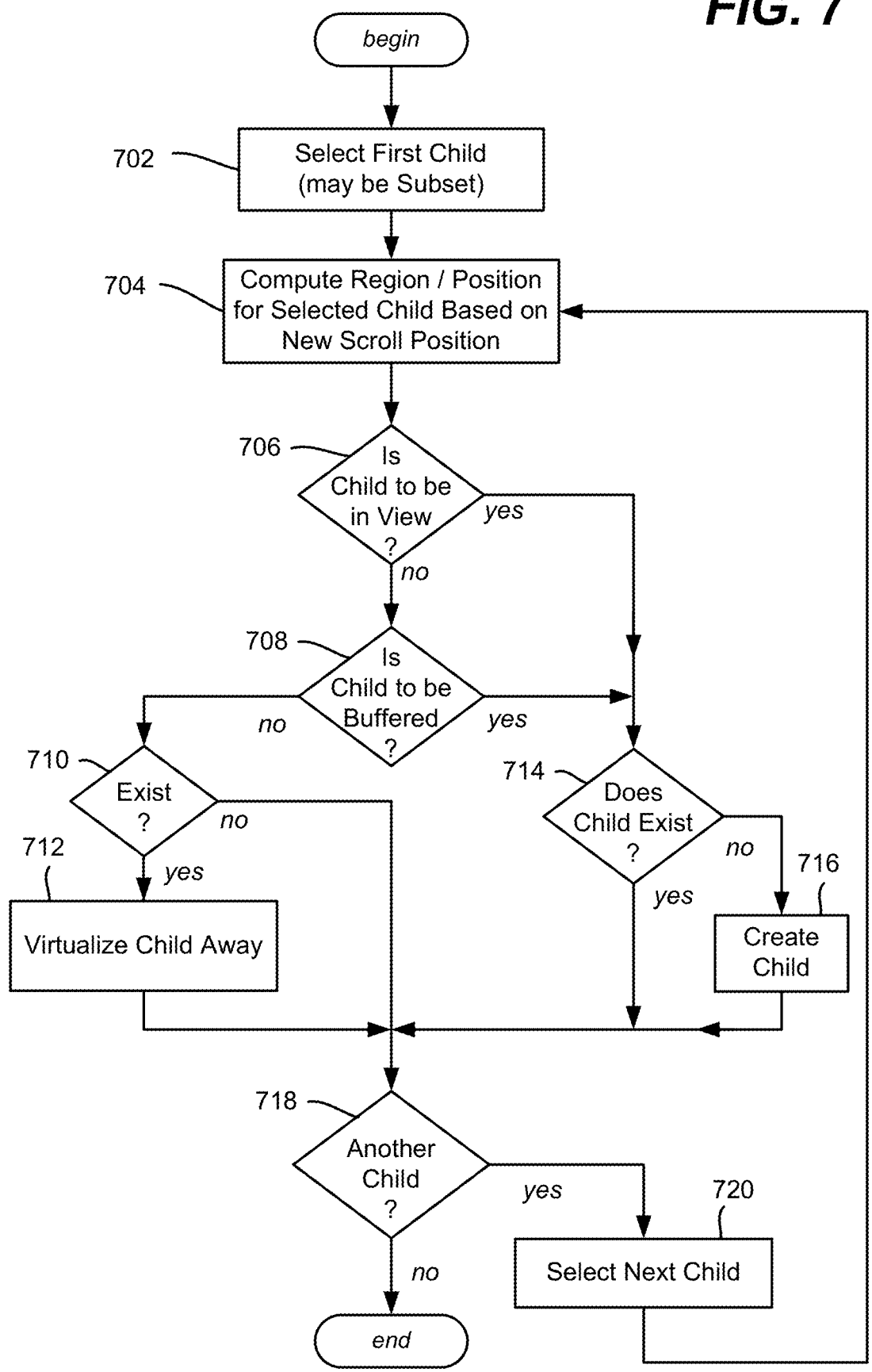
FIG. 7 is a flow diagram showing example steps related to determining which children are relevant with respect to change information and which are to be virtualized away, according to one or more example implementations.

FIG. 7 is a flow diagram showing example steps that may be taken by a parent container to determine which of its children are going to be relevant given the parent's new view, so that those children are ready for rendering themselves accordingly. Step 702 selects the first child, and step 704 computes the new relative position for that child in the scrolled view. If the child is to be in view (at least in part) as evaluated at step 706, the child is relevant to the view. If the child is not in view, step 706 determines whether the child is to be buffered, e.g., using the inflated region data and/or other criteria.

With respect to other criteria, deciding whether to create all or part of a UI element in advance (or deciding to not virtualize away an element that is scrolled out-of-view) may be based on many criteria, including memory space, processing time (possibly at a background priority), scroll direction, user history, and so on. For example, if a user has been scrolling right, it may be heuristically determined that it makes sense to buffer some number of (e.g., four) UI elements to the right and keep a lesser number of (e.g., two) UI elements to the left. A user who is paging down eight UI elements at a time may be expected to do so again, whereby at least the next eight UI elements may be preemptively created. As another example, a hover action over a container may result in preemptively creating elements of the container on the likelihood that the user is about to interact with that container's elements.

A parent may use such criteria in determining the size of the inflated space, and/or a child may use such criteria (not necessarily the same criteria as the parent) to determine how much of the inflated space to fill. By passing the inflated region through the interface, each descendant element reacts to any change and (possibly using some buffering criteria) is able to allocate any additional objects in the off-screen buffered space, as well as those in view.

Returning to FIG. 7, if a child is not relevant according to steps 706 and 708, the child, if it exists at step 710, is virtualized away at step 712. If a child is relevant according to step 706 or step 708, the child is created at step 716 if it does not already exist (step 714). Steps 718 and 720 repeat the process for other children.

Note that FIG. 7 walks through each child of a parent as a candidate to determine a next state for that child. However it is understood that FIG. 7 may operate on subsets of a parent's children rather than on all of them, and some of the steps may be in batches rather than one at a time. For example, consider that a parent has 1,000 children in a list array; the parent can compute that the new scroll offset start corresponds to approximately child number 500 and ends at approximately child number 550. Thus, the subset of children being evaluated may be reduced (as indicated in step 702). With some amount of buffering allowed, the parent may instead wish to deal with an expanded subset, e.g., child number 490 to child number 560, and virtualize away any others outside this range that may exist.

Numerous other ways for a parent to virtualize needed relevant children and virtualize away existing irrelevant ones may be used. For example, an array of children may be filtered by position criteria into groups, with irrelevant groups virtualized away and relevant groups having members ensured to be created, using a find or create type command on each member. Partially relevant groups may have its relevant members individually found or created and irrelevant members virtualized away.

Returning to FIG. 6, step 608 selects the first relevant (now known to be existing) child. Data representative of the new scroll position is propagated at step 610 to that selected child through the interface described above, that is, the bounds data, the visible region data, the desired region data and so forth that the child needs to have to decide upon rendering itself (or not, if not in view) and its children, if any. Steps 612 and 614 repeat the propagation at step 610 for each existing child.

Figure 8:
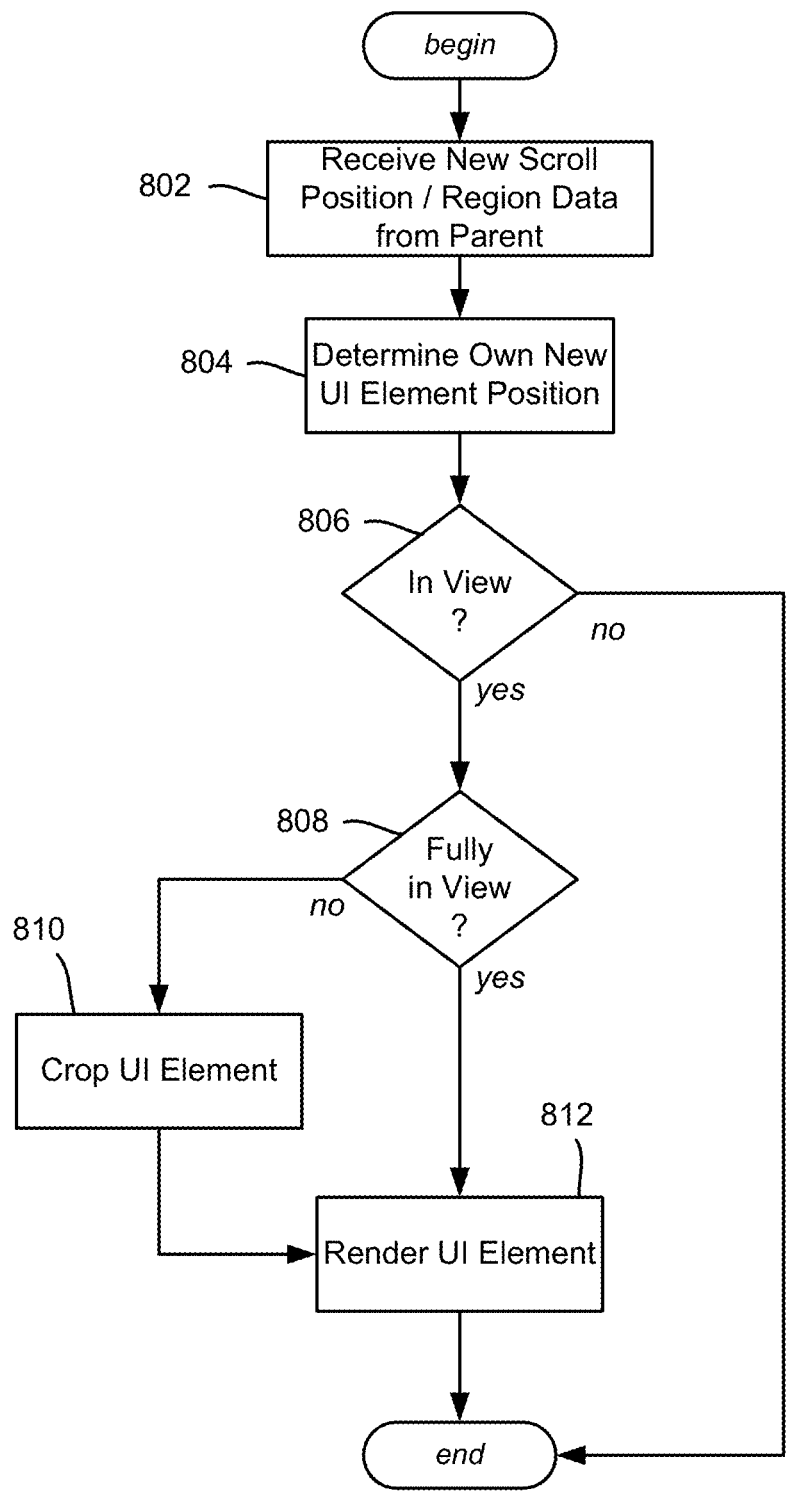
FIG. 8 is a flow diagram showing example steps related to determining rendering of a UI element, according to one or more example implementations.

FIG. 8 is a flow diagram of example steps showing part of what a child does when it receives the propagated data that corresponds to the new scroll position/new space. Step 802 represents receiving this data, with step 804 using that data to determine its own new UI element (if and when rendered) position in the parent's scroll space.

Step 806 evaluates whether the UI element if rendered is to be in the new current view. If not, there is nothing to render. If in view, step 808 determines whether all of it or part of it will be in view. If only part, step 810 crops the visible portion of the UI element so as to fit in the available view space. Step 812 renders the element, whether in whole or in part (as cropped at step 810).

The other thing a child does, if it is also a parent container, is to propagate its view space information to any children that it has. To this end, a child that is also a parent container may use the steps already described above with reference to FIG. 6. In this instance, the parent container has already recomputed (if needed) its available space, and possibly had to adjust its own scroll position, as if the parent had been interacted with directly rather than indirectly. Thus, the logic of FIG. 6 may be used by any parent, except that step 602 refers to receiving propagated data from a parent and step 604 may use existing computations.

Turning to aspects related to focus change, often a next focus location is easy to determine, because the user selects an element directly, e.g., by a click or tap. However, consider that the next focus location needs to be computed to be determined, which often happens with typing, or may be possible with speech navigation. As one example, consider that the user selects (types or taps) the right cursor key when there is no element to the right to give focus to in the same container; (there may be an element to the right in a different container, but the current container does not know that).

Figure 9A:
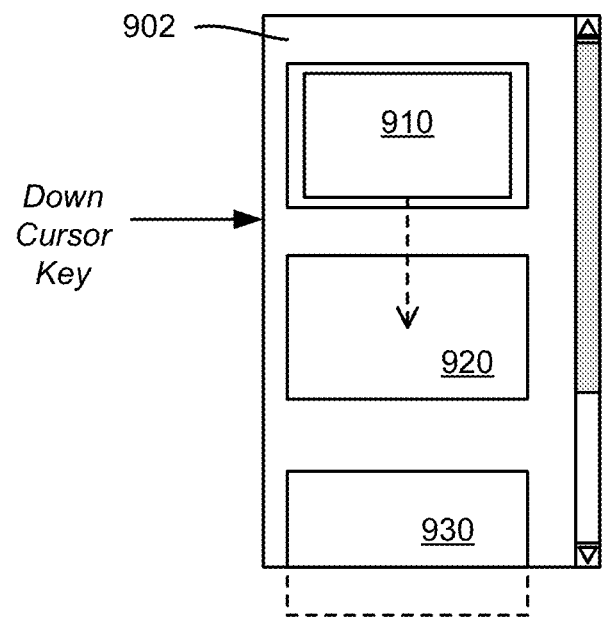
FIGS. 9A and 9B are example representations of focus changes within a container, according to one or more example implementations.
Figure 9B:
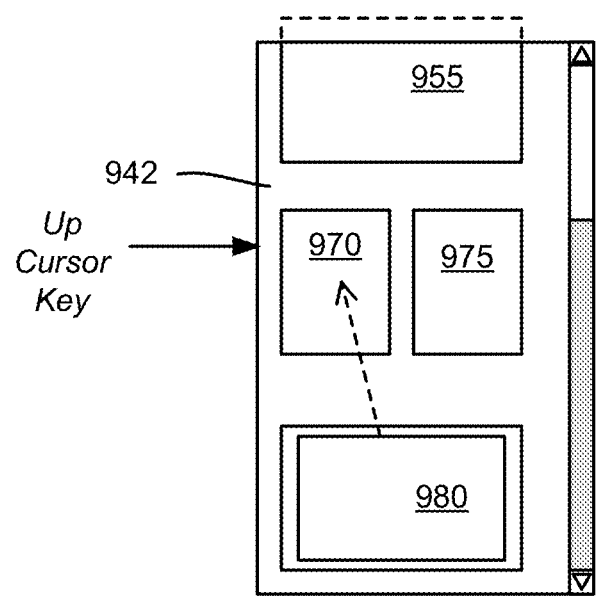

For example, FIGS. 9A and 9B show how a focus change first attempts to stay in its own container. In general, note that a container that has interactive elements therein does not have focus, but rather focus is given to a contained element (that is not a container) in that container. Further note that in alternative implementations it is feasible to give focus to a container, such as to vary its appearance so that the user knows that container is active, without any specific element therein having focus until some further user interaction occurs.

In FIG. 9A, a down cursor key received at a vertical list container element 902 changes focus from the currently focused element 910 to the next focusable element 920 in the down direction. In FIG. 9B, an up cursor key received at another vertical list container element 942 changes focus from the currently focused element 980 to the next focusable element 970 in up direction (with some rule specifying that the element 970 is favored over the element 975).

To this end, a container generally has rules for what to do if a user interacts to change focus via keyboard or speech (rather than directly selecting an element for focus). If as in FIGS. 9A and 9B there is another element in the container in the corresponding focus change direction, then the container attempts to shift focus to that other element.

Consider however that the element 920 of FIG. 9A is itself a container and thus does not get focus. If the new element is not focusable as it is itself a container, then the new container 920, based on the last focus data, decides what element within it next attempts to get focus. As described above, a rule may tell the container to select an in-view element therein based on what is closest; if no element previously was in view, then the container may instead take some other action, such as to attempt to give focus to the first element in the container. If the next child element chosen for focus is also a container, the process repeats recursively until a focusable, non-container element gets focus.

As another aspect, consider that in FIG. 9A the user selects the right cursor key indicating the user wants to move right. As in FIG. 1, the user is likely indicating that the user wants to shift focus to a focusable element to the right, whether a directly focusable element or one within a different container. However, the container 902 in FIG. 9A does not have any child to the right, and is not aware of any external element to the right, as the container 902 is only aware of its children and its parent.

Figure 10:
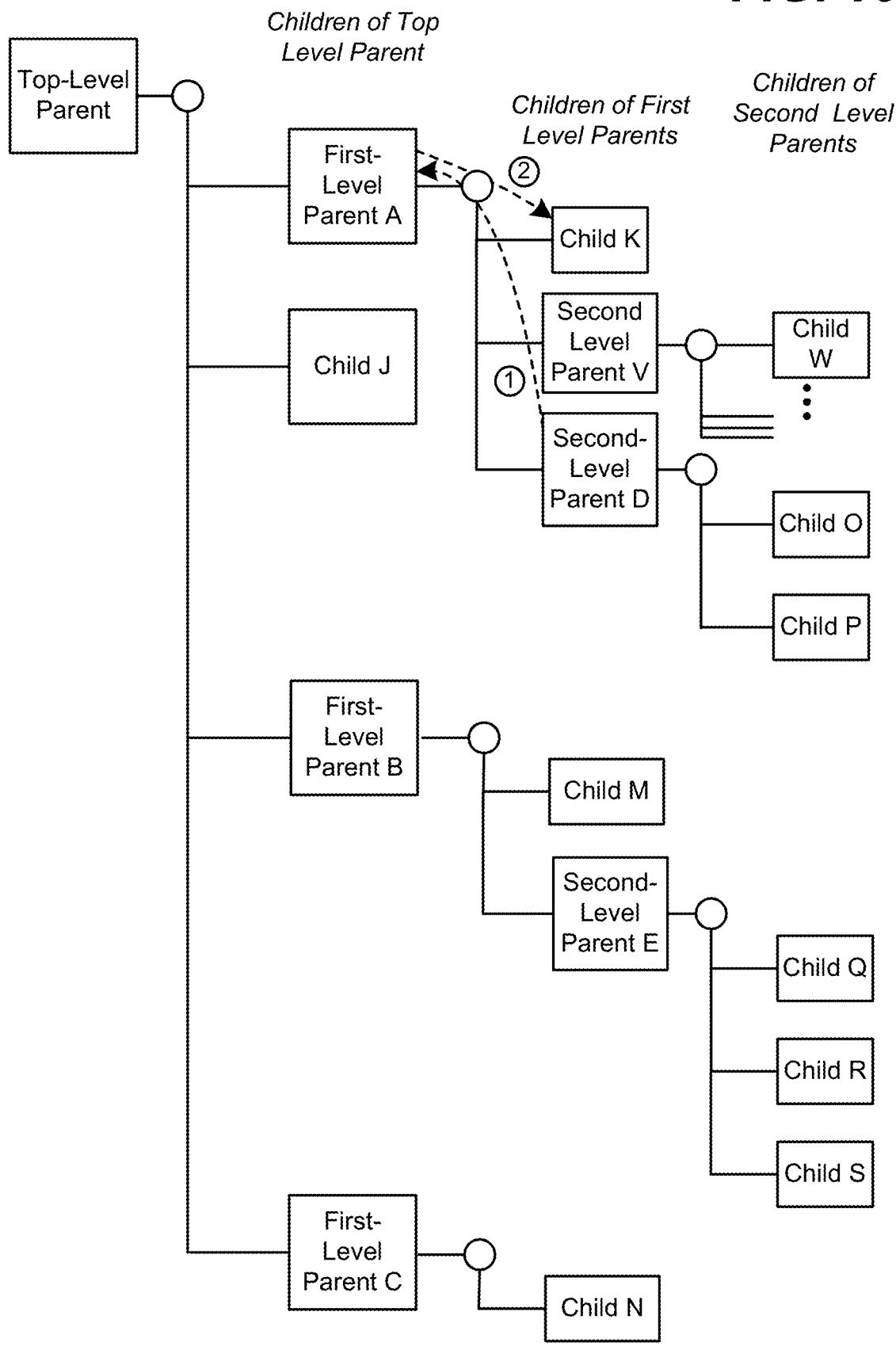
FIG. 10 is an example representation of a hierarchy of UI elements, including communication of a focus change from a container to its parent and to that parent's child, according to one or more example implementations.

Thus, a focus change request that is not able to be handled within a container is sent up to its parent via the virtualization interface, e.g., in FIG. 10 from Parent D to Parent A as represented by the curved, dashed arrow labeled one (1). As with other containers, the parent that is now responsible for focus, Parent A, first attempts to change focus to an element within its own container, as it may have other children in the focus change direction.

Figure 11A:
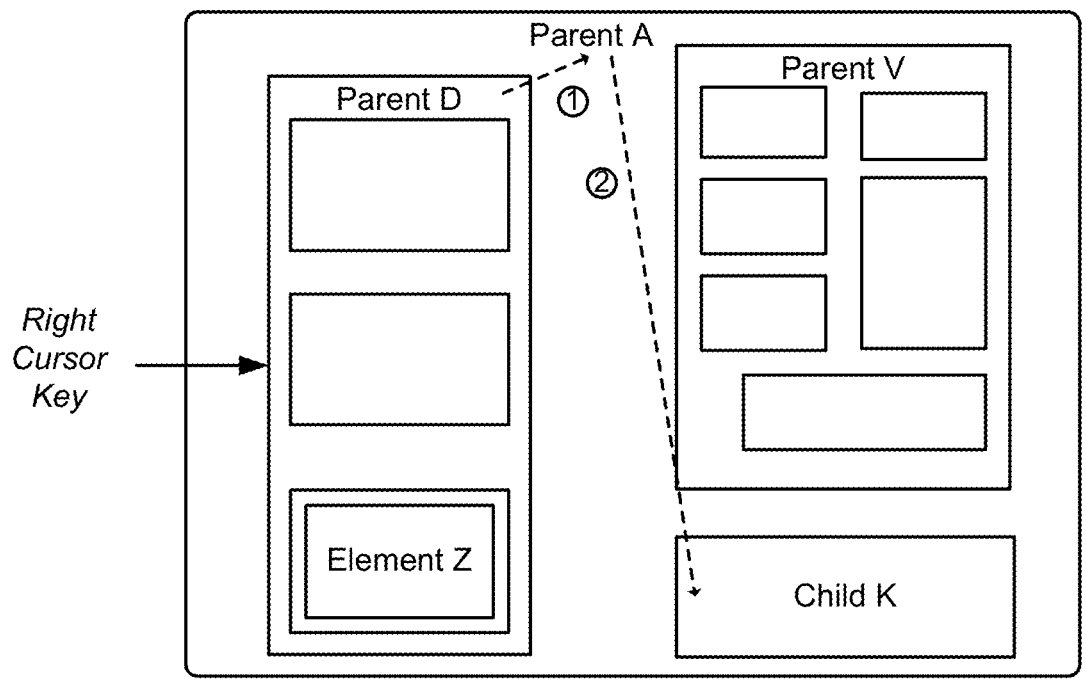
FIGS. 11A and 11B are example representations of focus changes from an element in one container to an element in a different container, according to one or more example implementations.

For example, in FIG. 11A, consider that element Z has focus and a right cursor key is selected. Because the container D does not know how to handle this request, container Parent D passes the focus change request up to it parent container Parent A, along with focus data indicating where focus previously was positioned (e.g., centered) and the direction of the focus change request (e.g., to the right). Parent A receives the request, and evaluates whether there is a peer element to the right of the previously focused element Z in Parent A's container, (even if not well-aligned, or possibly not aligned at all). In this example, there is an element to the right, Child K, whereby focus is given to Child K based on the focus data (closest to the previous focus position data in the requested direction). This is also represented by the curved, dashed arrow labeled two (2) in FIG. 10.

Figure 11B:
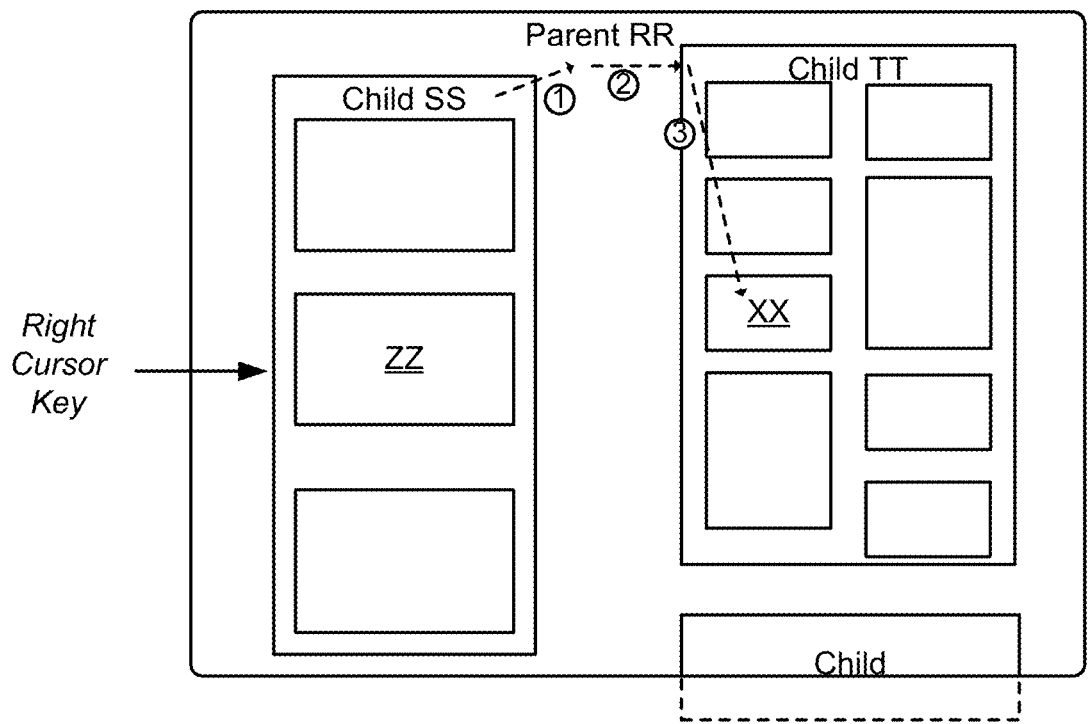

FIG. 11B shows a situation in which focus is passed in a rightward direction from a focused element ZZ to an element XX in another container. In this example, as before, the parent RR (of both containers SS and TT) gets the focus request and focus data from its child SS, which is the parent container of element ZZ, as indicated by the dashed arrow labeled one (1). The parent RR recognizes that it has a child TT to the right, and thus passes this request to its closest child element to the right, which is the parent container TT of the element XX. However, this element TT is also a container. The new container TT, using rules, determines that the closest child element it has to the previous focus position is the element XX. If the element XX is focusable, the element XX gets focus. If the new element XX is itself a container, then that container XX decides, based on the focus data, which of its elements is closest, and so on. The process repeats recursively until a non-container element gets focus.

It should be noted that "closeness" is only one possible rule for changing focus, and any container may have its own rules. For example, a container may always give focus to one specific child, e.g., the first one in its array, regardless of from where focus originated. External factors such as popularity of an element may be used in determining a container's focused child element, provided this information may be conveyed in some way to the container.

Figure 12:
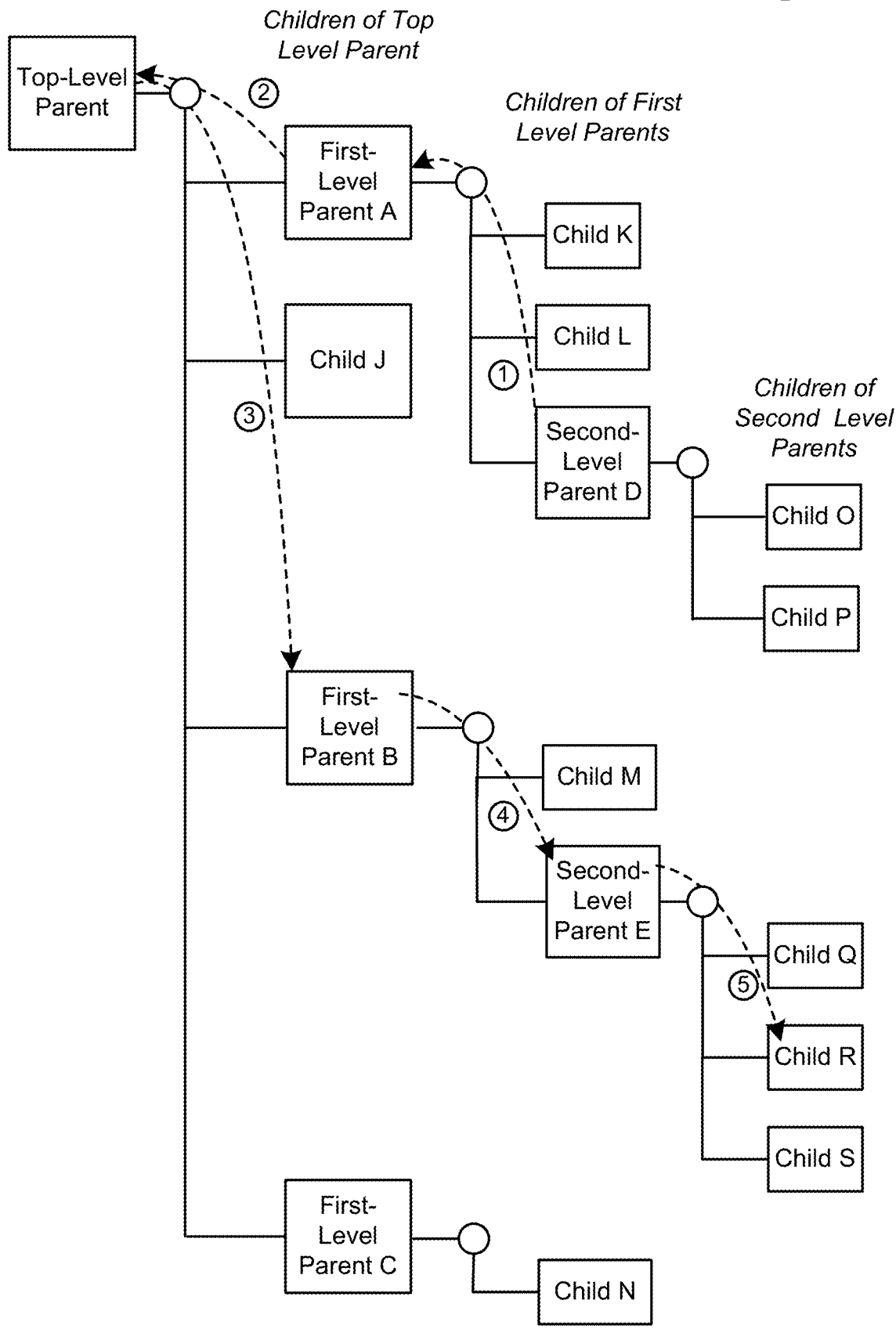
FIG. 12 is an example representation of a hierarchy of UI elements, including communication of a focus change up and down the hierarchy, according to one or more example implementations.

In the event that a parent cannot shift focus to a peer element in the requested direction, then the parent passes the request up further. For example, in the element hierarchy of FIG. 12, the parent A gets the request (curved, dashed arrow one (1)), but there is no directionally appropriate peer; (e.g., the selected cursor key in FIG. 11A was instead a down cursor or a left cursor when element ZZ had focus). Thus, in FIG. 12, the parent A passes the focus change request to its parent, the top-level parent (arrow two (2)).

Figure 13:
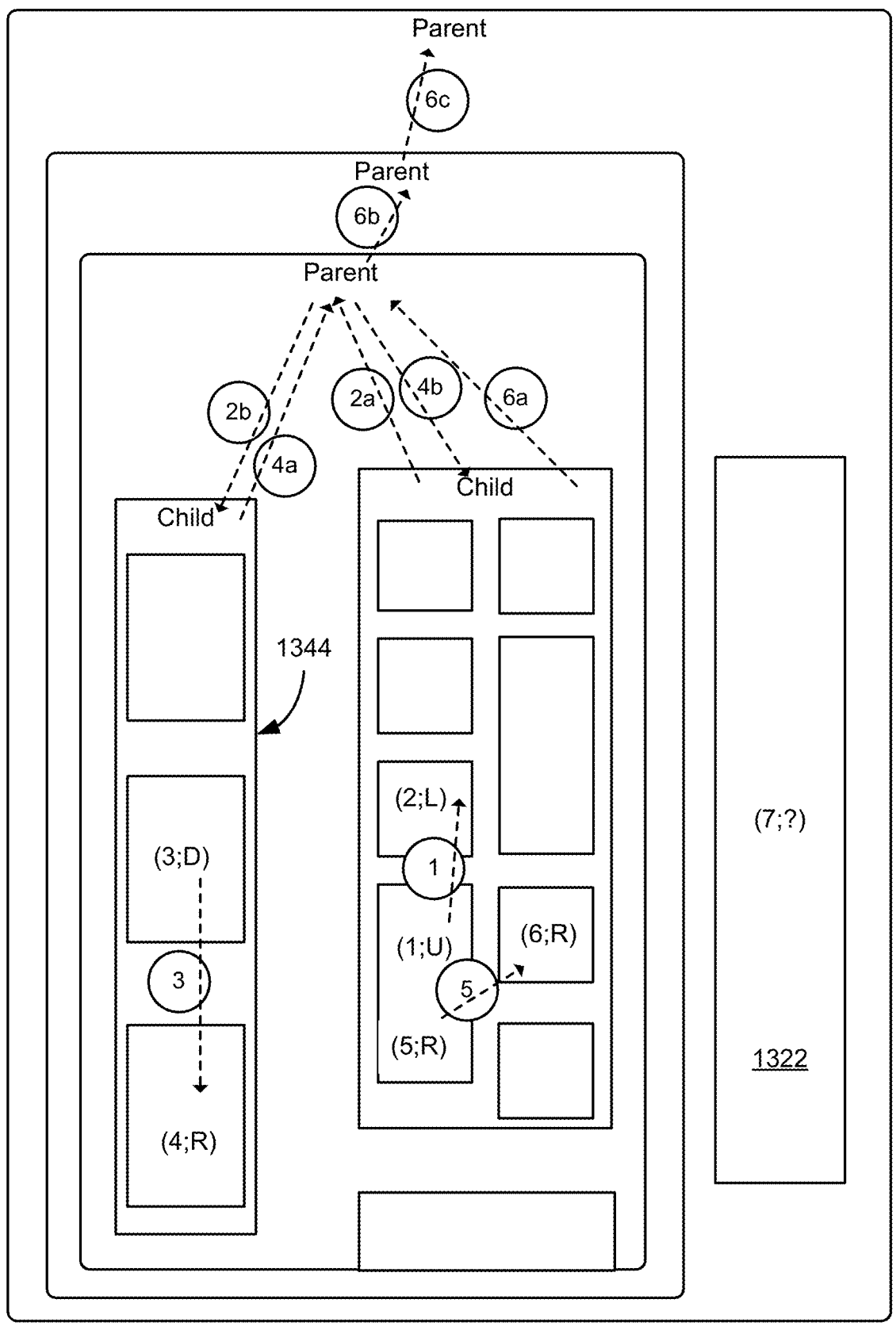
FIG. 13 is an example representation of a how a series of focus change events are managed in a hierarchical user interface, according to one or more example implementations.

In this example, the top-level parent finds a directionally appropriate peer, Parent B, and passes the focus change request to that parent (arrow three (3)). In this example, the closest element is the Parent E, and thus the request is passed to Parent E (arrow four (4)), and from there to a focusable element (e.g., based on closeness), child R (arrow five (6)), FIG. 13 shows an example of how focus may change among focusable elements within the same container and outside of the current container. In FIG. 13, an element that has or had focus is labeled with the focus sequence number (1;_) through (7;_) the underscore "_" is filled in with the cursor key that is selected after that element was in focus for some time, (U). (R). (L) and (D) for up, right, left and down, respectively; (although (7,?) is used to indicate the user has not yet moved focus from the element labeled 1322). Thus, for example, the first focused element moves up (1;U) to the second focused element, which in turn moves left (2;L) to the third focused element which moves down (3;D) to the fourth focused element and so on.

The first arrow labeled one (1) shows that the first focus change is up (1;U) and stays within the same container. However, the container does not know how to handle the next move left from there (2;L), so the container communicates with its parent (arrow (2a)). The parent has a left child peer, and thus passes the focus change request to that child (arrow (2*b*)). Thus, the closest element to the second focused element gets focus, even though it is in a different container.

Focus is moved down from the third focused element (3;D) whereby focus stays in the same container at the next element in the down direction, the fourth element in focus in this example. The container does not know where to go with the next move (4;R), so the container contacts its parent (arrow (4*a*)), which because of the right change request in turn contacts the peer child to the right (arrow (4*b*)). Thus, focus is shifted right to complete the fifth focus change.

A next move from this element (5;R) is within the same container, so focus shifts right (arrow (5)) for the sixth focus change. The next focus move, (6;R) is not able to be changed to anything in the container, so the request goes to the parent (arrow 6(*a*)). This time the parent container has no child peer to the right, so the request bubbles up to the higher parent, (arrow 6(*b*)). This higher parent also has no right peer, so the request bubbles up to the next higher parent, (arrow 6(*c*)).

This next higher parent can handle the focus shift, and thus does so for the seventh focus change to the element labeled 1322. A next move is not represented in FIG. 13, and is thus shown as (7;?).

To summarize, focus stays in a container if possible. If focus leaves a container, because there is no element within that container to which focus may be shifted, the container informs its parent of the need for the parent to handle the focus change, passing it the focus data. The parent then looks for a directionally appropriate peer to the child container that passed focus data up to the parent; (if it does not find one, then that parent notifies its parent). If there is directionally appropriate peer, then the parent switches focus to that peer. If the peer is also container, the peer container attempts to change focus to a child element as described above for transferring focus within a container.

If focus leaves a container and the change request reaches the top-level parent container because no directionally appropriate peer container can be found by any lower-level parent, then there is a possibility that the top-level parent is also unable to find a directionally appropriate peer element. If this happens, then the process ends without a focus change. For example, this occurs in FIG. 13 if the user selects the right cursor key following the seventh focus change (7;R) and the parent of that focused element is the top-level parent. The top-level parent may reject such a focus change, whereby focus stays at the element 1322, as is typically expected by users.

Figure 14:
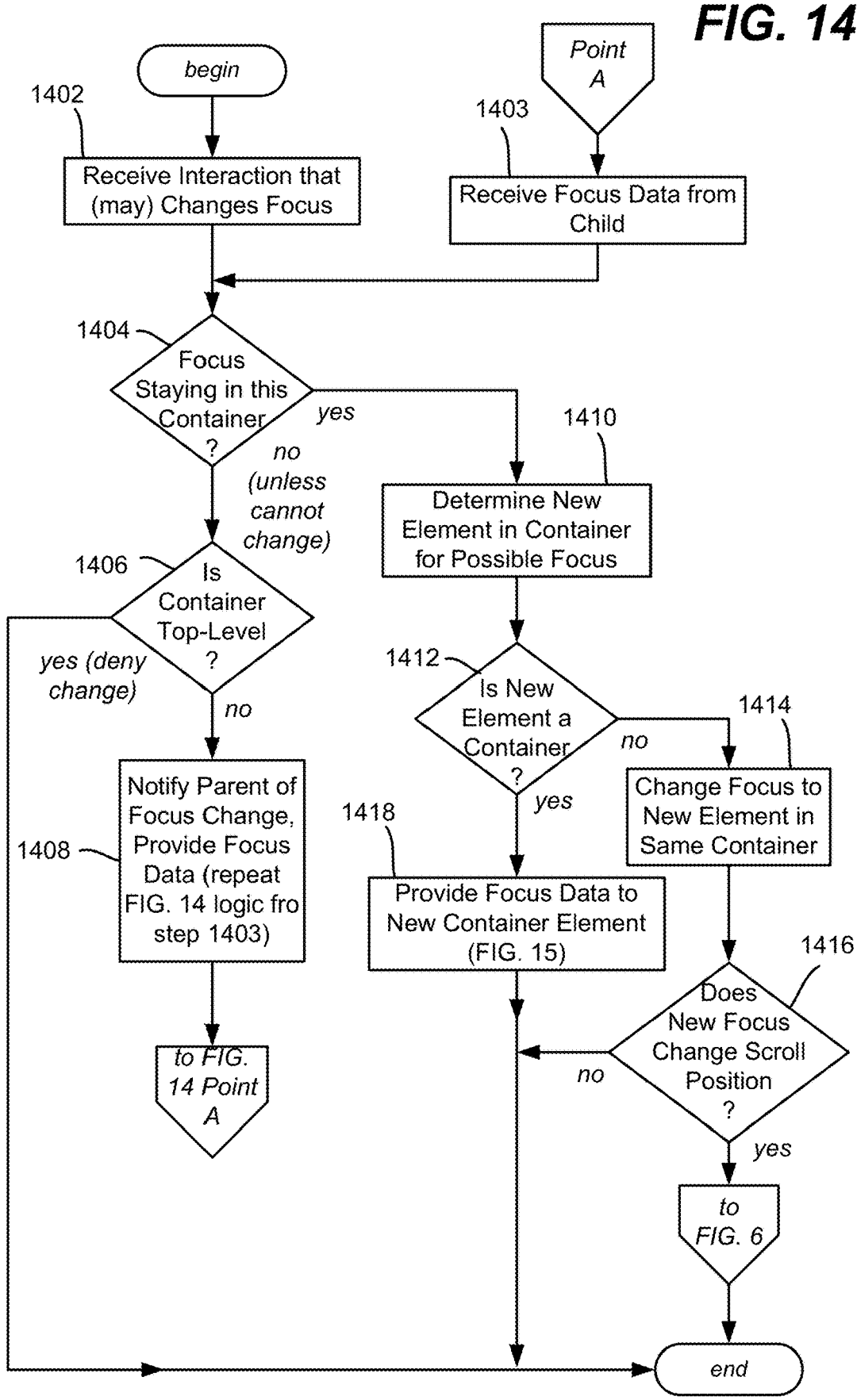
FIG. 14 is a flow diagram showing example steps related to handling a focus change at a UI container element, according to one or more example implementations.
Figure 15:
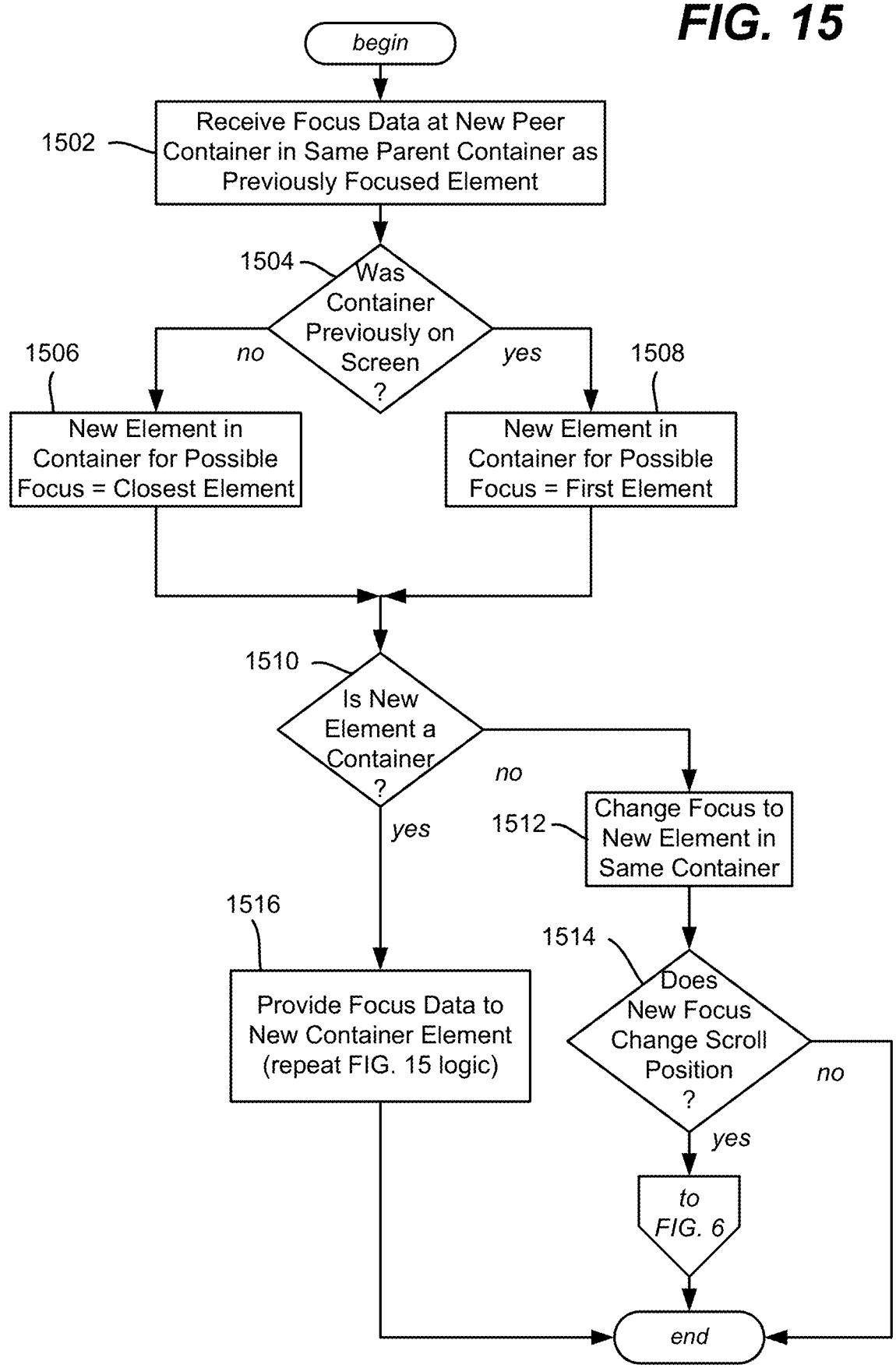
FIG. 15 is a flow diagram showing example steps related to locating an element in a container for receiving focus, according to one or more example implementations.

FIGS. 14 and 15 are flow diagrams representing example steps related to changing focus where the new focus is not by direct selection of a new element; (direct selection may be accomplished simply by giving focus to the selected element and changing the scroll position if needed, e.g., so that the newly focused element is fully in view).

Step 1402 is directed toward a container receiving some input that changes focus (although there is a possibility that focus cannot be changed as described herein). Step 1404 represents the container determining whether, according to focus change rules, the focus change can be to a different, directionally appropriate child element in the same container, as generally described above. If not, the process branches to step 1406.

At step 1406, the current container evaluates whether it is already the top-level container; if so, there is no container to transfer the focus to, (otherwise step 1406 would not be reached, as the container rules at step 1404 would have branched to step 1410 if such an element was present). If the top-level container cannot change focus, e.g., the focus is already on the rightmost element and the user has requested a focus shift further right), the focus change request is denied and focus remains on the currently focused element.

If not the top-level container at step 1406, then the container notifies its parent at step 1408, and provides it with the focus data (current focus position and requested direction) as also described herein. Handling a focus request passed up from a child is described below, (also with reference to FIG. 14, but beginning at step 1403).

If focus is staying in the current container (step 1404), then step 1410 determines the new peer element to which a focus change is to be attempted. As described above, if the new element is a focusable element at step 1412 rather than a container, then step 1412 branches to step 1414 where focus is changed to that new element. Step 1416 evaluates whether the focus change is to an element that is currently out-of-view, in which event the scroll position needs to change; (the re-rendering and virtualization impact due to a scroll change may be handled as in FIGS. 6 and 7). The scroll position also may be changed for a now-focused element that is only partially in view, e.g., to get the entire focused element into view, and if this is desired, is also handled via step 1416 and FIG. 6.

Returning to step 1412, consider that the new peer element instead is a container, in which event some descendant element (child, child of a child and so on) will get the focus. Step 1418 provides the focus data to that peer container; FIG. 15 shows example steps of how that peer container handles the focus data to locate the next element.

In FIG. 15, step 1502 receives the focus data from the parent (the parent of both the previously focused element and this now-selected peer container). Steps 1504, 1506 and 1508 are (mostly) optional steps to demonstrate how a container can have its own rules for selecting a next element for attempted focus transfer. More particularly, in this example, the container to which focus responsibility has been transferred determines at step 1504 whether it was previously in view (at least in part), or whether the focus change is what will be bringing this container into view (which is likely indicative of significant movement, such as paging). According to these rules, if the container was in view when the focus change occurred, the container attempts to find its closest element to the previous focused element (based on the focus data) at step 1506. If the selected container was not previously in view, then an attempt is made at step 1508 to transfer focus to the first element of the container.

Step 1510 evaluates whether the new element (the closest via step 1506 or the first via step 1508) is also a container. If not, then step 1512 changes focus to this new element. Step 1514 and FIG. 6 handle any needed scrolling as a result of the focus change, as described above.

If the new element is also a container, then the focus is data is provided to the new container. As can be readily appreciated, the new container runs the same logic of FIG. 15 for its child element(s) and so on, until a focusable element is found.

Figure 16:
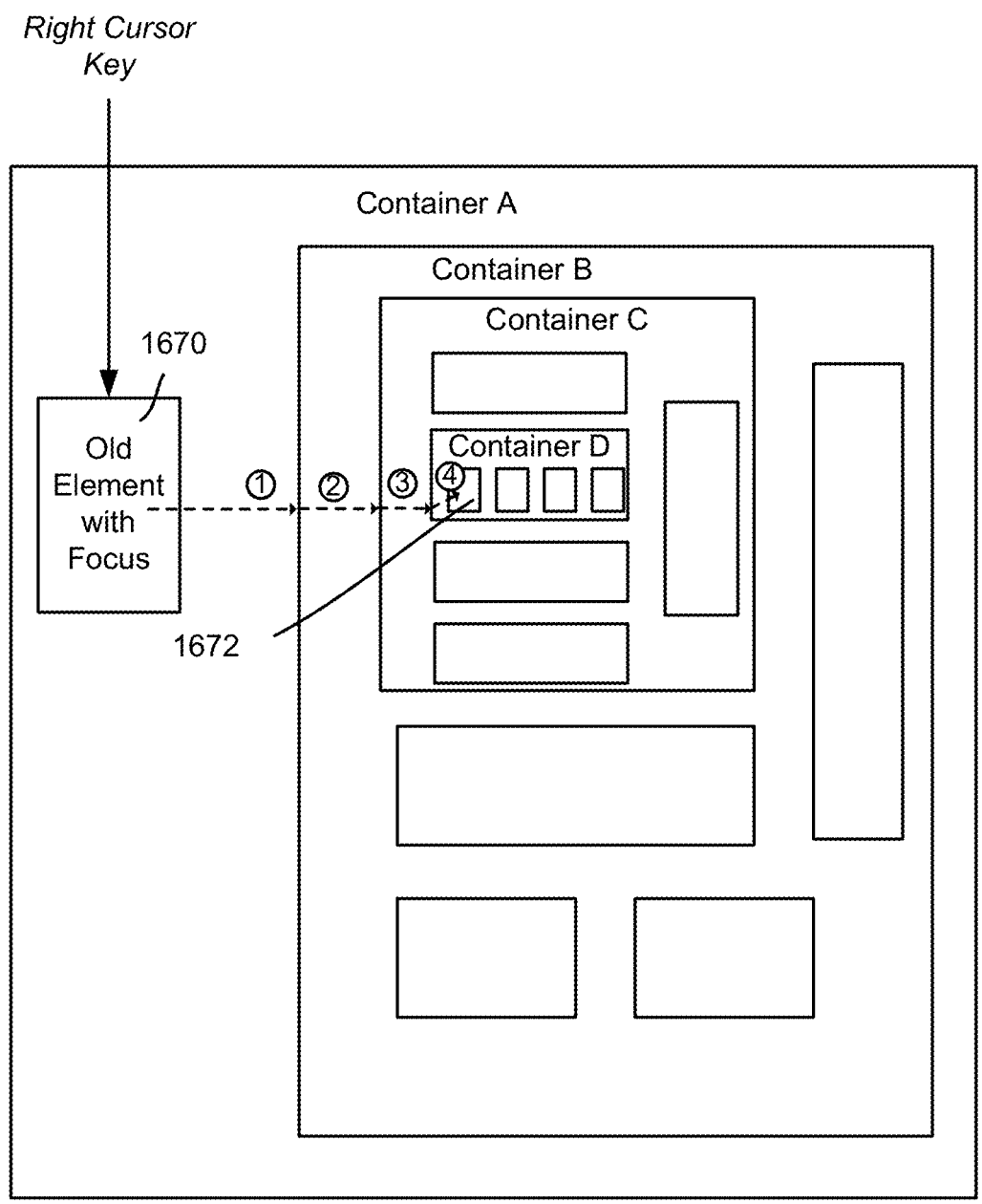
FIG. 16 is an example representation of how hierarchical UI elements may communicate to locate an element in a container for receiving focus, according to one or more example implementations.

FIG. 16 demonstrates this "recursive" running of FIG. 15's logic to find an element. Consider that element 1670 of container A has focus, and that the user selects a right cursor key. Container A, running the logic of FIG. 15, determines that container B is the closest peer element, and thus transfers responsibility for focus to container B (arrow one (1)). Container B, also then runs the logic of FIG. 15, accordingly determines that container C is the closest peer element, and thus transfers responsibility for focus to container C (arrow two (2)). The process is repeated by container C, resulting in a transfer of responsibility to container D (arrow three (3)). Container D also runs the logic of FIG. 15, but this time finds that its closest element is not a container, but rather a focusable element 1672. Thus, the element 1672 gets focus, which is likely what the user intended when selecting the right cursor key from the element 1670. Note that in an actual implementation, the elements 1670 and 1672 may be very close to one another.

Returning to FIG. 14, consider that focus is not staying in the container at step 1404. As can be readily appreciated, when a container is given focus responsibility by a child, it is very similar to when the container was given focus responsibility by user interaction, and thus (most of) the logic of FIG. 14 may be repeated by the higher parent container. A difference is that the container uses the focus data provided by the child container. This is represented via step 1408 which continues at step 1403 to repeat the remainder of the logic of FIG. 14 (it is understood that the logic is repeated by the higher parent).

The logic of FIG. 14 has been described above and is thus not repeated herein, except to note that if the current parent container cannot handle the focus change, the logic of FIG. 14 may continue to be repeated by higher and higher level parents as needed, until one is found that can handle the focus change, or the focus change cannot be handled by any higher parent and is thus ultimately denied by the top-level parent.

Note that an alternative to denying a focus change request is to allow the top-level parent container to wrap a focus change, e.g., from a rightmost position to a leftmost position or vice-versa (or similarly from the lowest to the topmost position, or vice-versa). To this end, if the top-level container rules permit such wraparound behavior, then step 1404 will locate a directionally appropriate peer element, if one exists. Thus, in the example of FIG. 13 in the case where the highest parent illustrated is also the top-level parent, instead of denying a focus change right request from element 1322 and leaving focus on that element, the top-level parent will recognize the leftmost container 1344 as a peer element, whereby focus will be shifted to that element (or if a container, ultimately to some non-container element in that container's hierarchy), The notion of "closest" may need to be changed for such wraparound behavior, as the available space essentially becomes circular in the X-direction (or the Y direction).

As can be seen, the technology described herein provides a structured way to nest any UI element or tree into a virtualization of a list, grid or any container view. Any number of levels may be nested. For any view or sub-view, only the elements currently in view need be instantiated. For example rather than maintaining a large list of one-thousand UI elements instantiated in memory, only ten may be shown on the screen, with four buffered on either side, such that only eighteen total need to be instantiated at any one time.

One or more aspects are directed towards rendering a view corresponding to a parent UI element, the view including at least one child UI element of the parent UI element. Upon receiving a change to the view, aspects are directed towards determining which child UI element or children UI elements of the parent UI element are relevant based upon the change to the view, and creating any non-instantiated child UI element that is relevant. Further described is determining which child UI element or children UI elements of the parent UI element are not relevant based upon the change to the view, and virtualizing away at least one child UI element that is not relevant. Data corresponding to the change to the view are propagated to each relevant child UI element of the parent UI element, and a new view corresponding to the parent UI element is rendered, the new view including one or more relevant child UI elements of the parent UI element.

Determining which child UI element or children UI elements of the parent UI element are relevant based upon the change to the view may comprise determining whether each child is to be rendered within the new view. Determining which child UI element or children UI elements of the parent UI element are relevant based upon the change to the view may comprise determining whether each child is to be rendered in the new view or is within an inflated view. Rendering the new view may comprise having each child UI element of the one or more relevant children UI elements determine whether that child is in view, and if so, rendering that child UI element in the new view.

Other aspects may include receiving the data representing the change at a relevant child UI element that is a lower-level parent to one or more lower-level child UI elements, and in response, determining which of the one or more lower-level child UI elements are relevant based upon the change to the view, and creating any non-instantiated child UI element that is relevant. This may further include determining which of the one or more lower-level child UI elements are not relevant based upon the change to the view, and virtualizing away any child UI element that is not relevant. Data representing the change may be propagated to each relevant lower-level child UI element of the lower-level parent UI element. Receiving the change to the view may comprise receiving user interaction directed to scrolling the parent UI element, receiving user interaction directed to resizing or zooming the parent UI element, or receiving user interaction directed to changing focus from a child UI element of the parent UI element to another UI element.

Changing the focus from a child UI element of the parent UI element to another UI element may include changing the focus to another child UI element of the parent UI element.

Changing the focus from a child UI element of the parent UI element to another UI element may include changing the focus to a child UI element of a different parent UI element. Focus data may be communicated to the different parent UI element. The focus data may include direction data, which may be used for determining whether the different parent UI element has a peer UI element that is positioned in a direction corresponding to the direction data, and if so, changing focus to the peer UI element. If not, the focus data may be communicated to a higher parent UI element.

One or more aspects are directed towards a parent container UI element having a visualization object interface, the parent container UI element corresponding to a view. A child UI element of the parent container UI element is configured to communicate with the parent container UI element via the visualization object interface. The parent container UI element receives a change with respect to the view, and based on the change to the view, a) propagates change information corresponding to the change to the child UI element via the visualization object interface, or b) visualizes away the child element. The parent container UI element may create another child UI element based on the change to the view. The parent container UI element may be a top-level parent hosted in a view host.

The child UI element may be a lower-level parent container element corresponding to a sub-view of the view, with the lower-level parent container element containing a lower-level child UI element configured to communicate with the parent container UI element via a visualization object interface. If the lower-level parent container element receives the change information, the lower-level parent container UI element is configured to, based on the change information, a) visualize away the lower-level child element or b) propagate the change information to the child UI element via the visualization object interface.

The parent container UI element may determine whether to visualize away the child element or to propagate change to the child UI element based upon whether the child element is to be in a new view, the new view corresponding to the view including the change with respect to the view. The parent container UI element may determine whether to visualize away the child element or to propagate change to the child UI element based upon a) whether the child element is to be in a new view, the new view corresponding to the view including the change with respect to the view, or b) whether the child element is within an inflated view relative to the new view.

One or more aspects are directed towards receiving a scroll interaction at a parent container corresponding to a view, the parent container containing a plurality of UI elements, determining a new view based upon the scroll interaction, and determining which of the plurality of UI elements of the parent container are relevant UI elements with respect to the new view. At least one UI element that is not relevant is virtualized away. Change information corresponding to the scroll interaction is propagated to the relevant UI elements, including a relevant UI element comprising a lower-level container containing a plurality of lower-level UI elements. A determination is made as to which of the plurality of lower-level UI elements of the lower-level container are relevant lower-level UI elements with respect to the new view; at least one lower-level UI element that is not relevant is virtualized away. Change information corresponding to the scroll interaction is propagated to the relevant lower-level UI elements.

EXAMPLE COMPUTING DEVICE

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 17 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 17:
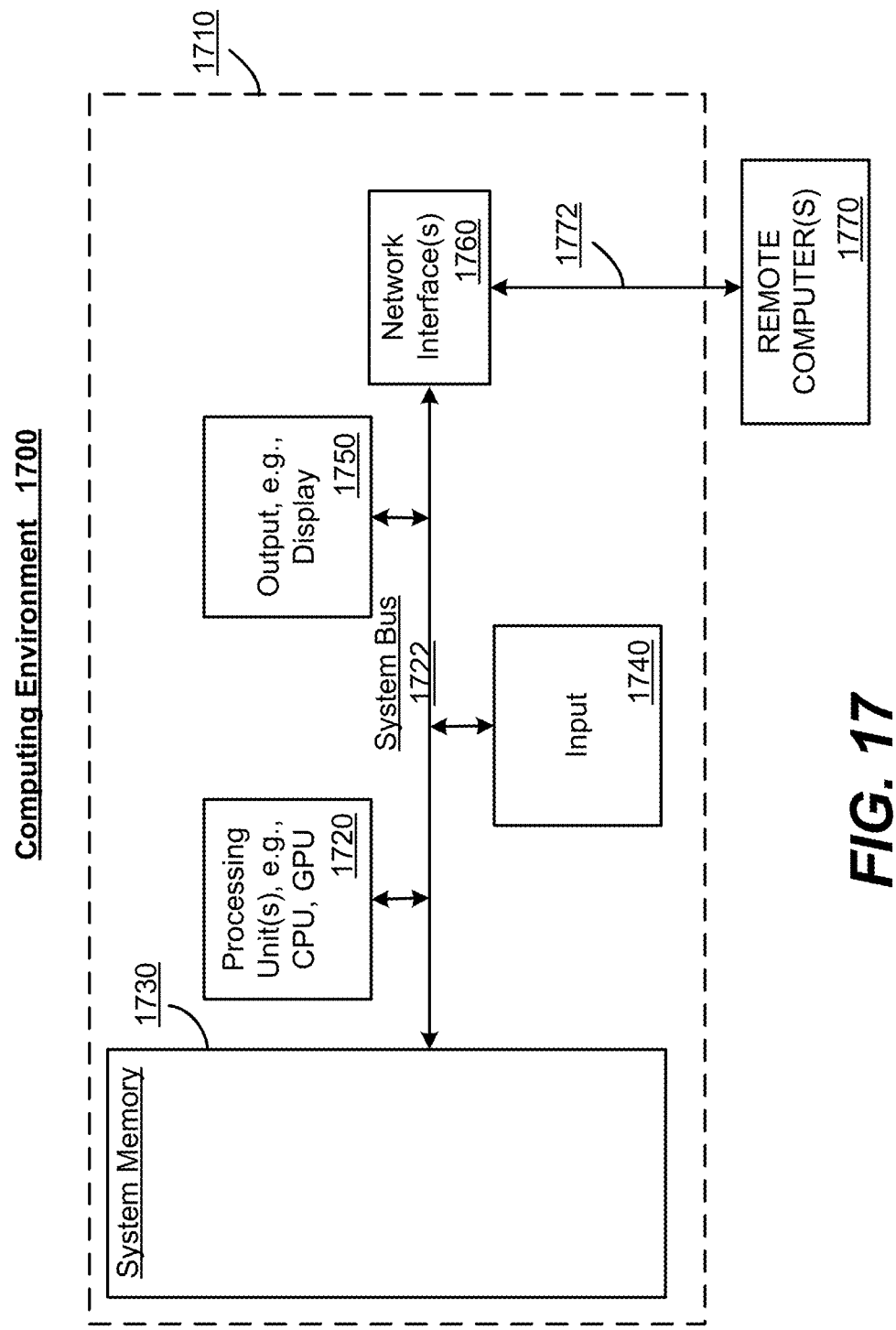
FIG. 17 is a block diagram representing an example computing environment into which aspects of the subject matter described herein may be incorporated.

FIG. 17 thus illustrates an example of a suitable computing system environment 1700 in which one or aspects of the implementations described herein can be implemented, although as made clear above, the computing system environment 1700 is only one example of a suitable computing environment and is not intended to suggest any limitation as to scope of use or functionality. In addition, the computing system environment 1700 is not intended to be interpreted as having any dependency relating to any one or combination of components illustrated in the example computing system environment 1700.

With reference to FIG. 17, an example device for implementing one or more implementations includes a general purpose computing device in the form of a computer 1710. Components of computer 1710 may include, but are not limited to, a processing unit 1720, a system memory 1730, and a system bus 1722 that couples various system components including the system memory to the processing unit 1720.

Computer 1710 typically includes a variety of machine (e.g., computer) readable media and can be any available media that can be accessed by a machine such as the computer 1710. The system memory 1730 may include computer storage media in the form of volatile and/or nonvolatile memory such as read only memory (ROM) and/or random access memory (RAM), and hard drive media, optical storage media, flash media, and so forth. By way of example, and not limitation, system memory 1730 may also include an operating system, application programs, other program modules, and program data.

A user can enter commands and information into the computer 1710 through one or more input devices 1740. A monitor or other type of display device is also connected to the system bus 1722 via an interface, such as output interface 1750. In addition to a monitor, computers can also include other peripheral output devices such as speakers and a printer, which may be connected through output interface 1750.

The computer 1710 may operate in a networked or distributed environment using logical connections to one or more other remote computers, such as remote computer 1770. The remote computer 1770 may be a personal computer, a server, a router, a network PC, a peer device or other common network node, or any other remote media consumption or transmission device, and may include any or all of the elements described above relative to the computer 1710. The logical connections depicted in FIG. 17 include a network 1772, such as a local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method comprising:

rendering a view of a parent user interface (UI) element;

receiving input prompting a change to the view, wherein in response to the receiving the input:

determining, by the parent UI element, a new view of the parent UI element based on the input, including determining a visible region of the parent UI element corresponding to the new view;

determining, by the parent UI element, one or more first child UI elements of the parent UI element that are relevant to the new view based on the one or more first child elements being included within or partially included within the visible region;

creating, by the parent UI element, any non-instantiated child UI element of the one or more first child UI elements;

rendering the new view of the parent UI element;

providing, by the parent UI element via a first virtualization interface, first view change data describing the new view to the one or more first child UI elements in response to the one or more first child UI elements being included within or partially included within the visible region, wherein the first view change data defines first bound parameters of the visible region, wherein based on the reception of the first view change data as a result of the providing, the one or more first child UI elements independently determine, based on the first bound parameters, whether to virtualize or virtualize away any second child elements of the one or more first child UI elements;

in response to a first child UI element of the one or more first child UI elements being a parent to a second child element, determining, by the first child UI element based on the first bound parameters, second bound parameters of the first child UI element within the parent UI element; and providing, by the first child UI element, second view change data to the second child UI element describing the second bound parameters via a second virtualization interface employed by the first child UI element, wherein based on the reception of the second view change data, the second child UI element independently determines, based on the second bound parameters, whether to virtualize or virtualize away any third child UI elements of the second child UI element.

2. The method of claim 1, further comprising determining, by the parent UI element based on the input, an inflated region outside of the visible region.

3. The method of claim 2, wherein the determining the one or more first child UI elements further comprises determining the one or more first child UI elements of the parent UI element that are relevant to the new view based on the one or more first child elements being included within the visible region or the inflated region.

4. The method of claim 3, wherein the rendering the new view comprises rendering any of the one or more first child UI elements included within the visible region and wherein the method further comprises creating and buffering any of the one or more first child UI elements included within the inflated region.

5. The method of claim 1, wherein the receiving the input comprises receiving user interaction directed to scrolling the parent UI element, wherein the determining the new view comprises determining a new scroll position within current visible boundaries of the parent UI element, and wherein the view change data further identifies the new scroll position.

6. The method of claim 1, wherein the receiving the input comprises receiving user interaction directed to resizing or zooming the parent UI element.

7. The method of claim 1, wherein the receiving the input comprises receiving user interaction directed to changing focus from a first child UI element of the parent UI element to a second child UI element.

8. The method of claim 7, wherein the second child UI element comprises a child UI element of the parent UI element.

9. The method of claim 7, wherein the second child UI element comprises a child UI element of a different parent UI element.

10. The method of claim 9, further comprising communicating focus data to the different parent UI element.

11. The method of claim 10, wherein the focus data includes direction data, and further comprising determining whether the different parent UI element has a peer UI element that is positioned in the direction corresponding to the direction data, and if so, changing focus to the peer UI element.

12. The method of claim 10, wherein the focus data includes direction data, and further comprising determining whether the different parent UI element has a peer UI element that is positioned in the direction corresponding to the direction data, and if so, changing focus to the peer UI element, and if not, communicating the focus data to a higher parent UI element.

13. A system comprising: a memory that stores computer executable components; and a processor that executes the computer executable components stored in the memory, wherein the computer executable components comprise: a parent container user interface (UI) element having a first virtualization interface; and at least one child UI element of the parent container UI element, wherein the parent container UI element is configured to communicate with at least one the child UI element via the first virtualization interface, wherein the parent container UI element is configured to: receive input prompting a change to a rendered view of the parent container UI element, in response to reception of the input, determine a new view of the parent container UI element based on the input, including determining a visible region of the parent container UI element corresponding to the new view, determine one or more first child UI elements of the parent container UI element that are relevant to the view based on the one or more first child UI elements being included within or partially included within the visible region, create any non-instantiated child UI element of the one or more first child UI elements, render the new view of the parent container UI element, and provide first view change information describing the new view to the one or more first child UI elements via the first virtualization interface in response to the one or more first child UI elements being included within or partially included within the visible region, wherein the view change data defines first bound parameters of the visible region, and wherein based on the reception of the view change data as a result of the sending, the one or more first child UI elements independently determine, based on the first bound parameters of the visible region, whether to virtualize or virtualize away any second child elements of the one or more first child UI elements, and wherein in response to a first child UI element of the one or more first child UI elements being a parent to a second child element, the first child UI element: determines, based on the first bound parameters, second bound parameters of the first child UI element within the parent UI element; and provides second view change data to the second child UI element describing the second bound parameters via a second virtualization interface employed by the first child UI element, wherein based on the reception of the second view change data, the second child UI element independently determines, based on the second bound parameters, whether to virtualize or virtualize away any third child UI elements of the second child UI element.

14. The system of claim 13, wherein the parent container UI element is further configured to:
  determine one or more second set of child UI elements of the parent UI element that are not relevant to the new view based on being excluded from the visible region, and
  virtualize away at least one second child UI element of the second the one or more second child UI elements.

15. The system of claim 13, wherein the parent container UI element comprises a top-level parent hosted in a view host.

16. The system of claim 13, further comprising determining, by the parent container UI element based on the input, an inflated region outside of the visible region.

17. The system of claim 16, wherein the parent container UI element renders any of the one or more first child UI elements included within the visible region and wherein the parent UI container element further creates and buffers any of the one of more first child UI elements included within the inflated region.

18. A non-transitory machine-readable storage medium, comprising executable instructions that, when executed by a processor of a device, facilitate performance of operations, the operations comprising:
  receiving a scroll interaction at a parent container UI element containing a plurality of child UI elements, wherein in response to receiving the scroll interaction:
    determining, by the parent container UI element, a visible region of the parent container UI element for viewing based upon the scroll interaction;
    determining, by the parent container UI element, one or more first child UI elements of the plurality of child UI elements that are included within or partially included within the visible region;
    rendering the visible region of the parent container UI element;
    providing, by the parent container UI element via a first virtualization interface in response to the one or more first child UI elements being included within or partially included within the visible region, first view change information defining first bound parameters of the visible region of the parent container UI element to the one or more first child UI elements;

independently determining, by the one or more first child elements based on the first view change information, whether to virtualize or virtualize away any second child elements of the one or more first child elements;

in response to a first child UI element of the one or more first child UI elements being a parent to a second child element, determining, by the first child UI element based on the first bound parameters, second bound parameters of the first child UI element within the parent UI element; and providing, by the first child UI element, second view change data to the second child UI element describing the second bound parameters via a second virtualization interface employed by the first child UI element, wherein based on the reception of the second view change data, the second child UI element independently determines, based on the second bound parameters, whether to virtualize or virtualize away any third child UI elements of the second child UI element.

19. The non-transitory machine-readable storage medium of claim 18, wherein the second bound parameters define a second visible region of the first child UI element for rendering within the visible region of the parent container UI element, and wherein the first child UI element further provides the second view change data to the second child UI element in response to a determination that the second child UI element is included within or partially included within the second visible region.

20. The non-transitory machine-readable storage medium of claim 19, wherein the first child UI element further provides the second view change data to the second child UI element via the second view virtualization interface in response to another determination that first the child UI element has been configured to participate in view virtualization by implementing the second view virtualization interface.

\* \* \* \* \*